United States Patent
Hayashi et al.

(10) Patent No.: US 9,322,388 B2
(45) Date of Patent: Apr. 26, 2016

(54) NATURAL-FREQUENCY ADJUSTING MECHANISM FOR WAVE-POWER GENERATOR

(75) Inventors: Kentaro Hayashi, Tokyo (JP); Takeshi Yasunaga, Tokyo (JP); Shunichi Ikesue, Tokyo (JP); Makoto Ohta, Tokyo (JP); Masami Miura, Tokyo (JP); Yasuyoshi Takamoto, Tokyo (JP); Yoshinori Kobayashi, Tokyo (JP); Hideaki Hashimoto, Tokyo (JP); Shozo Kaneko, Tokyo (JP); Akira Hashimoto, Tokyo (JP)

(73) Assignees: MITSUBISHI HEAVY INDUSTRIES, CO., LTD., Tokyo (JP); THE UNIVERSITY OF TOKYO, Tokyo (JP)

(\*) Notice: Subject to any disclaimer, the term of this patent is extended or adjusted under 35 U.S.C. 154(b) by 216 days.

(21) Appl. No.: 14/002,189

(22) PCT Filed: Mar. 15, 2012

(86) PCT No.: PCT/JP2012/056613
§ 371 (c)(1),
(2), (4) Date: Jan. 31, 2014

(87) PCT Pub. No.: WO2012/124747
PCT Pub. Date: Sep. 20, 2012

(65) Prior Publication Data
US 2014/0132003 A1 May 15, 2014

(30) Foreign Application Priority Data

Mar. 17, 2011 (JP) .................. 2011-059142
Mar. 31, 2011 (JP) .................. 2011-080747
Mar. 31, 2011 (JP) .................. 2011-080748
Mar. 31, 2011 (JP) .................. 2011-080750

(51) Int. Cl.
*F03B 13/12* (2006.01)
*F03B 13/20* (2006.01)
(Continued)

(52) U.S. Cl.
CPC ............... *F03B 13/20* (2013.01); *F03B 13/14* (2013.01); *F03B 15/00* (2013.01); *F05B 2260/403* (2013.01); *F05B 2260/4031* (2013.01); *F05B 2270/18* (2013.01); *Y02E 10/38* (2013.01)

(58) Field of Classification Search
CPC ....................................... F03B 13/20
See application file for complete search history.

(56) References Cited

U.S. PATENT DOCUMENTS 7,323,790 B2 \* 1/2008 Taylor et al. ............. 290/42
2004/0201223 A1 10/2004 Grinsted et al.
(Continued)

FOREIGN PATENT DOCUMENTS

CN  1163988 A   11/1997
CN  201650572 U  11/2010
(Continued)

OTHER PUBLICATIONS

Written Opinion mailed Jun. 12, 2012, corresponding to PCT/JP2012/056613.
(Continued)

*Primary Examiner* — Tho D Ta
(74) *Attorney, Agent, or Firm* — Kanesaka Berner and Partners LLP

(57) ABSTRACT

Provided is a wave-power generator capable of adjusting a natural period (natural frequency) in response to a changing wave period. The wave-power generator includes a weight that is installed in a floating body via a spring and that linearly reciprocates in response to a fluctuation of a water surface and a generator that generates power by being driven based on the linear reciprocating motion of the weight. An additional-mass body for adding a mass to the mass of the weight is further included.

18 Claims, 20 Drawing Sheets

(51) Int. Cl.
*F03B 15/00* (2006.01)
*F03B 13/14* (2006.01)

(56) References Cited

U.S. PATENT DOCUMENTS

| | | | |
|---|---|---|---|
| 2007/0126239 A1 | 6/2007 | Stewart et al. | |
| 2008/0309088 A1* | 12/2008 | Agamloh et al. | ............... 290/53 |
| 2009/0085357 A1 | 4/2009 | Stewart | |
| 2009/0146429 A1 | 6/2009 | Protter et al. | |

FOREIGN PATENT DOCUMENTS

| | | |
|---|---|---|
| DE | 10055846 A1 | 5/2002 |
| JP | 5-164036 A | 6/1993 |
| JP | 2002-506162 A | 2/2002 |
| JP | 2005-207332 A | 8/2005 |
| JP | 2007132336 A | 5/2007 |
| JP | 2007-297929 A | 11/2007 |
| JP | 2009-518568 A | 5/2009 |
| JP | 2009-535560 A | 10/2009 |
| JP | 2009535566 A | 10/2009 |
| WO | 2007/045853 A1 | 4/2007 |
| WO | 2007064827 A2 | 6/2007 |
| WO | 2007137426 A1 | 12/2007 |

OTHER PUBLICATIONS

Decision to Grant a Patent mailed Sep. 2, 2014, corresponding to Japanese patent application No. 2011-080747.
Decision to Grant a Patent mailed Sep. 2, 2014, corresponding to Japanese patent application No. 2011-080748.
Office Action mailed Sep. 2, 2014, corresponding to Japanese patent application No. 2011-080750.
Extended European Search Report issued Nov. 18, 2014, corresponding to European patent application No. 12757378.0.
Office Action issued May 6, 2015, corresponding to Chinese patent application No. 201280011031.6.
Decision to Grant a Patent mailed Mar. 31, 2015, corresponding to Japanese patent application No. 2011-080750.
International Search Report corresponding to PCT/JP2012/056613, dated Jun. 12, 2012.
Decision to Grant a Patent mailed Jan. 26, 2016, in CN Patent Application No. 201280011031.6.
Notice of Acceptance in AU Application No. 2012229831, mailed Feb. 17, 2016.

* cited by examiner

NATURAL-FREQUENCY ADJUSTING MECHANISM FOR WAVE-POWER GENERATOR

RELATED APPLICATIONS

The present application is a National Phase of International Application Number PCT/JP2012/056613, filed Mar. 15, 2012, and claims priority from Japanese Application Number 2011-059142, filed Mar. 17, 2011, Japanese Application Number 2011-080747, filed Mar. 31, 2011, Japanese Application Number 2011-080748, filed Mar. 31, 2011 and Japanese Application Number 2011-080750, filed Mar. 31, 2011.

TECHNICAL FIELD

The present invention relates to a wave-power generator.

BACKGROUND ART

There are known wave-power generators in which two objects are moved relative to each other in the vertical direction to drive a generator (for example, see PTLs 1 and 2).

CITATION LIST

Patent Literature

{PTL 1} Japanese Translation of PCT International Application, Publication No. 2009-535560
{PTL 2} Japanese Translation of PCT International Application, Publication No. 2009-518568

SUMMARY OF INVENTION

Technical Problem

In techniques disclosed in PTLs 1 and 2, it is necessary to select a mass and a spring according to the wave period.

However, since the wave period in an actual marine area typically varies widely from 3 to 10 seconds, there is a problem in that, even if a predetermined mass and spring are selected, the range of periods in which resonance occurs to allow power generation is limited, thus making it impossible to respond to the changing wave period, which reduces the capacity factor.

Furthermore, because it is assumed that a floating body does not oscillate when the natural period of the floating body is larger than the wave period, the natural period of the floating body is designed to be smaller than the design wave period. However, because the wave period in the actual marine area typically varies widely from 3 to 10 seconds, there is a problem in that the wave period in the actual marine area becomes significantly larger than the natural period of the floating body in some cases, so that the floating body does not effectively oscillate, thus reducing the capacity factor of the wave-power generator.

Furthermore, because the wave period is generally long, a long spring needs to be used so as to reduce the spring constant. Thus, there is a problem in that the device becomes larger.

The present invention has been made in view of such circumstances and provides a wave-power generator that is capable of adjusting the natural period (natural frequency) in response to changing wave period.

Furthermore, the present invention provides a wave-power generator that is capable of using a short spring having a high spring constant, thus achieving a reduction in size.

Solution to Problem

In order to solve the above-described problems, the wave-power generator of the present invention employs the following solutions.

According to a first aspect, the present invention provides a wave-power generator that is provided with an oscillating body that is installed in a floating body via a spring and that linearly reciprocates in response to a fluctuation of a water surface and a generator that generates power by being driven based on the linear reciprocating motion of the oscillating body, the wave-power generator including an additional-mass body for adding an additional mass to a mass of the oscillating body.

The oscillating body installed in the floating body via the spring linearly reciprocates in response to a fluctuation of the water surface. The generator is driven based on this linear reciprocating motion, thus generating power. According to the above-described wave-power generator of the first aspect of the present invention, the frequency fn can be calculated by using the following Equation (1) when it is assumed that the mass of the oscillating body is m, and the mass of the additional-mass body is Δm.

Specifically, if the frequency fn is set to the same value as that used in a conventional wave-power generator, the spring constant k can be increased. Thus, it is possible to shorten the spring, thus allowing a reduction in size of the wave-power generator.

[Formula 1]

$$fn = \frac{1}{2\pi}\sqrt{\frac{k}{m+\Delta m}} \quad (1)$$

Note that the generator of the present invention can be any type of generator as long as it is driven based on the linear reciprocating motion of the oscillating body, and the driving force transferred to the generator may be directly obtained from the oscillating body (for example, a linear generator), may be indirectly obtained via another mechanism, or may be obtained via the additional-mass body.

In the above-described wave-power generator according to the first aspect of the present invention, the additional mass of the additional-mass body may be adjustable.

Specifically, the frequency fn can be changed by changing the mass Δm of the additional-mass body.

Furthermore, it is possible to reduce the mass of the oscillating body by appropriately adjusting the mass Δm of the additional-mass body, thus allowing a further reduction in size of the wave-power generator.

The above-described wave-power generator according to the first aspect of the present invention may further include a conversion mechanism that converts the linear reciprocating motion of the oscillating body to rotational motion and a rotating body that is rotated by a torque extracted via the conversion mechanism and that drives the generator, in which the additional-mass body may be attached to the rotating body.

The conversion mechanism converts the linear reciprocating motion of the oscillating body to rotational motion, the torque obtained after the conversion rotates the rotating body, and this rotation drives the generator. Then, the additional-mass body is attached to the rotating body, and the moment of inertia of the additional-mass body produced when it is rotated is utilized as an additional mass, thereby improving the effect of the additional mass.

Furthermore, because the additional-mass body is attached to the rotating body, and the moment of inertia of the additional-mass body produced when it is rotated is utilized as an additional mass, the weight of the additional mass does not directly act on the spring attached to the oscillating body. Thus, the free length and the deflection of the spring can be reduced, thus allowing a further reduction in size of the wave-power generator.

In the above-described wave-power generator according to the first aspect of the present invention, the additional-mass body may be attached so as to be rotated together with the rotating body and may include a moving weight that can be moved in a radial direction from the center of rotation and a movement means for moving the moving weight in the radial direction.

The additional-mass body is attached so as to be rotated together with the rotating body, and the moment of inertia of the additional-mass body produced when it is rotated is utilized as an additional mass.

The additional-mass body of the first aspect of the present invention includes the moving weight that can be moved in a radial direction from the center of rotation, and the movement means moves the moving weight in the radial direction to locate it so as to obtain a desired additional mass. Specifically, if the moving weight is located at a radially outer side, the center of gravity moves to the radially outer side, thus increasing the moment of inertia to allow an increase in additional mass. In contrast, if the moving weight is located at a radially inner side, the center of gravity moves to the radially inner side, thus reducing the moment of inertia to allow a reduction in additional mass.

The above-described wave-power generator according to the first aspect of the present invention may have a configuration in which a conversion mechanism that converts the linear reciprocating motion of the oscillating body to rotational motion and a rotating body that is rotated by a torque extracted via the conversion mechanism and that drives the generator are further included, and the additional-mass body is attached so as to be rotated together with the rotating body and is moved forward and backward with respect to water.

The conversion mechanism converts the linear reciprocating motion of the oscillating body to rotational motion, the torque obtained after the conversion rotates the rotating body, and this rotation drives the generator. Then, the additional-mass body is attached so as to be rotated together with the rotating body and is moved forward and backward with respect to the water. Before the additional-mass body is submerged, the additional mass produced by the additional-mass body includes the moment of inertia of the additional-mass body and the resistance to stirring of an ambient fluid (typically, air). Then, when the additional-mass body is submerged in the water, the resistance is further increased by the viscosity and the specific gravity of water, thus increasing the additional mass. In this way, the additional mass can be adjusted by moving the additional-mass body forward and backward with respect to the water.

In the above-described wave-power generator according to the first aspect of the present invention, the additional-mass body may be provided with a blade whose base end portion is attached to the rotating body and that extends in a radial direction.

The additional-mass body is provided with the blade whose base end portion is attached to the rotating body and that extends in the radial direction. By providing the blade extending in the radial direction, it is possible to further increase the resistance in the water and to increase the degree of adjustment of the additional mass.

Note that the additional-mass body can be formed of only the blade or can be formed of a combination of the blade and, for example, a disc-shaped rotational plate-like body for obtaining the moment of inertia.

In the above-described wave-power generator according to the first aspect of the present invention, a pitch angle of the blade may be changed.

The angle of attack with respect to the water can be changed in the water by changing the pitch angle of the blade. Thus, the degree of adjustment of the additional mass can be further increased.

In the above-described wave-power generator according to the first aspect of the present invention, the additional-mass body may be formed of a rotational plate-like body fixed to the rotating body; and the rotational plate-like body may be provided with a fin.

The resistance in the water can be increased by attaching the fin to the plate-like body. Thus, the degree of adjustment of the additional mass can be increased.

In the above-described wave-power generator according to the first aspect of the present invention, the fin may be moved forward and backward with respect to the rotational plate-like body.

The resistance in the water can be adjusted by allowing the fin to be moved forward and backward with respect to the rotational plate-like body. Thus, the degree of adjustment of the additional mass can be further increased.

Furthermore, it is also possible to divide the fin into multiple pieces and to allow them to be moved forward and backward individually, thereby finely setting the degree of adjustment of the additional mass.

In any of the above-described wave-power generators according to the first aspect of the present invention, it is preferable that a ball screw or a rack and a pinion be used as the conversion mechanism.

In any of the above-described wave-power generators according to the first aspect of the present invention, it is more preferable that a guide rail be provided in the floating body in the direction of the linear reciprocating motion, a ball be provided between the guide rail and the oscillating body, and the guide rail, the oscillating body, and the ball constitute a linear motion guide.

According to this configuration, because the resistance (mechanical loss) produced when the oscillating body linearly reciprocates is reduced, the power generation efficiency can be further improved.

Any of the above-described wave-power generators according to the first aspect of the present invention may further include an electric-power extracting mechanism that includes the oscillating body and the generator and that has an axis in the direction of the linear reciprocating motion of the oscillating body, in which the electric-power extracting mechanism may be placed such that the axis thereof matches a vertical axis that passes through the center of gravity of the floating body.

Because the axis of the electric-power extracting mechanism is placed so as to match the vertical axis that passes through the center of gravity of the floating body, a heave motion of the floating body can be efficiently converted to electric power.

Any of the above-described wave-power generators according to the first aspect of the present invention may further include an electric-power extracting mechanism that includes the oscillating body and the generator and that has an axis in the direction of the linear reciprocating motion of the oscillating body, in which the electric-power extracting mechanism may be placed such that the axis thereof is located at a position displaced from a vertical axis that passes through the center of gravity of the floating body, parallel to the vertical axis.

Because the axis of the electric-power extracting mechanism is placed at a position displaced from a vertical axis that passes through the center of gravity of the floating body, parallel to the vertical axis, a roll or pitch motion component of the floating body can be efficiently converted to electric power.

Note that it is preferable that a plurality of electric-power extracting mechanisms be placed at almost regular intervals.

Any of the above-described wave-power generators according to the first aspect of the present invention may further include an electric-power extracting mechanism that includes the oscillating body and the generator and that has an axis in the direction of the linear reciprocating motion of the oscillating body, in which the electric-power extracting mechanism may be placed such that the axis thereof is kept in a horizontal direction.

Because the axis of the electric-power extracting mechanism is placed in the horizontal direction, a horizontal motion component (yaw, surge, sway) of the floating body can be efficiently converted to electric power.

Note that it is preferable that a plurality of electric-power extracting mechanisms be placed at almost regular intervals.

Any of the above-described wave-power generators according to the first aspect of the present invention may further include an electric-power extracting mechanism that includes the oscillating body and the generator and that has an axis in the direction of the linear reciprocating motion of the oscillating body, in which the electric-power extracting mechanism may be placed such that the axis thereof is inclined with respect to the vertical direction.

Because the axis of the electric-power extracting mechanism is placed inclined with respect to the vertical axis, a motion component in every direction (heave, sway, surge, roll, pitch, and yaw) of the floating body can be efficiently converted to electric power.

Note that it is preferable that a plurality of electric-power extracting mechanisms be provided.

According to a second aspect, the present invention provides a wave-power generator including: a floating body that floats on a water surface; an oscillating body that is installed in the floating body via a spring and that linearly reciprocates in response to a fluctuation of the water surface; and a generator that generates power by being driven based on the linear reciprocating motion of the oscillating body, in which at least one of a floating-body mass of the floating body, an added mass of water on the floating body, and a floating-body spring coefficient of the floating body is adjustable.

The floating body oscillates in response to the fluctuation of the water surface, that is, the wave period; the oscillating body provided therein linearly reciprocates based on the oscillations of the floating body; and the generator is driven based on this linear reciprocating motion to generate power. The natural frequency fn' of the floating body can be calculated by using the following Equation (2) when it is assumed that the mass of the floating body is $m_b$, the added mass of water on the floating body is $m_{ba}$, and the floating spring coefficient of the floating body is $k_b$.

[Formula 2]

$$fn' = \frac{1}{2\pi}\sqrt{\frac{k_b}{m_b + m_{ba}}} \qquad (2)$$

Specifically, the natural frequency fn' of the floating body can be changed by changing at least one of the mass $m_b$ of the floating body, the added mass of water $m_{ba}$ on the floating body, and the floating spring coefficient $k_b$ of the floating body.

According to the wave-power generator of the second aspect of the present invention, because at least one of the mass $m_b$ of the floating body, the added mass of water $m_{ba}$ on the floating body, and the floating spring coefficient $k_b$ of the floating body is adjustable, the natural frequency of the floating body can be adjusted such that the floating body oscillates in response to the changing wave period in the actual marine area. Thus, the capacity factor of the wave-power generator can be improved.

Note that the generator of the present invention can be any type of generator as long as it is driven based on the linear reciprocating motion of the oscillating body to generate power, and the driving force transferred to the generator may be directly obtained from the oscillating body (for example, a linear generator), may be indirectly obtained via another mechanism, or may be obtained via the additional-mass body.

In the above-described wave-power generator according to the second aspect of the present invention, the floating body may be provided with a projecting member projecting outward from a side thereof; and a floating-body cross-sectional area at the water surface may be adjustable by changing an orientation of the projecting member.

The floating spring coefficient $k_b$ of the floating body can be expressed by the following Equation (3).

$$k_b = \rho g A_b \qquad (3)$$

Here, $\rho$ is the density of water (for example, seawater), g is gravitational acceleration, and $A_b$ is the floating-body cross-sectional area at the water surface.

As can be seen from Equation (3), the floating spring coefficient $k_b$ can be changed by changing the floating-body cross-sectional area $A_b$. In the present invention, the projecting member that projects outward from the side of the floating body is provided, and the floating-body cross-sectional area is adjusted by changing the orientation of the projecting member. Thus, it is possible to adjust the floating spring coefficient $k_b$ of the floating body, thus allowing adjustment of the natural frequency of the floating body.

Various methods can be used to change the orientation of the projecting member; for example, the projecting member is formed into a non-circular shape (for example, an elliptical shape or an oval shape) when viewed from the side of the floating body, and the projecting member can be rotated about an axis extending in the projecting direction to set a desired angular position or the projecting member can be moved forward and backward in the projecting direction.

In the above-described wave-power generator according to the second aspect of the present invention, a plurality of projecting members projecting outward from a side thereof may be provided in the vertical direction.

By providing a plurality of projecting members in the vertical direction, even when the relative position of the water surface to the floating body is changed, the floating-body cross-sectional area can be easily adjusted. Furthermore, the projecting members that are submerged can also be used to adjust the added mass of water on the floating body.

In any of the above-described wave-power generators according to the second aspect of the present invention, a water accommodating portion for accommodating water may be provided in the floating body; and a holding water level in the water accommodating portion may be adjustable.

The water accommodating portion is provided in the floating body, and the holding water level in the water accommodating portion can be adjusted. Thus, it is possible to change the mass of the floating body, thus allowing adjustment of the natural frequency of the floating body.

As the water accommodating portion, the space in a bottom portion of the floating body may be used, or a water tank may be provided at a side portion of the floating body.

In the above-described wave-power generator according to the second aspect of the present invention, a hydraulic pump may be used as a pump that pumps water into the water accommodating portion from outside of the floating body and/or that discharges the water in the water accommodating portion to the outside of the floating body.

A hydraulic pump is used as the pump for pumping water between the outside of the floating body and the water accommodating portion. Since the hydraulic pump is driven by water hammering and requires no electric power, electric power generated by using wave power is not wasted, and thus the power generation efficiency of the wave-power generator is not reduced.

Any of the above-described wave-power generators according to the second aspect of the present invention may further include an additional-mass body for adding an additional mass to a mass of the oscillating body, in which the additional mass of the additional-mass body may be adjustable.

Advantageous Effects of Invention

According to the present invention, the additional mass of the additional-mass body can be adjusted, thus making it possible to adjust the natural period of the oscillating body in response to the wave period. Therefore, the capacity factor of the wave-power generator can be improved.

Furthermore, in the wave-power generator of the present invention, because at least one of the mass $m_b$ of the floating body, the added mass of water $m_{ba}$ on the floating body, and the floating spring coefficient $k_b$ of the floating body is adjustable, it is possible to adjust the natural frequency of the floating body such that the floating body oscillates in response to the changing wave period in the actual marine area. Thus, the capacity factor of the wave-power generator can be improved.

Furthermore, according to the wave-power generator of the present invention, an advantageous effect is afforded in that it is possible to use a short spring having a high spring constant, thus achieving a reduction in size of the device.

DESCRIPTION OF EMBODIMENTS

Embodiments of the present invention will be described below with reference to the drawings.

First Embodiment

A first embodiment of the present invention will be described below.

Figure 1:
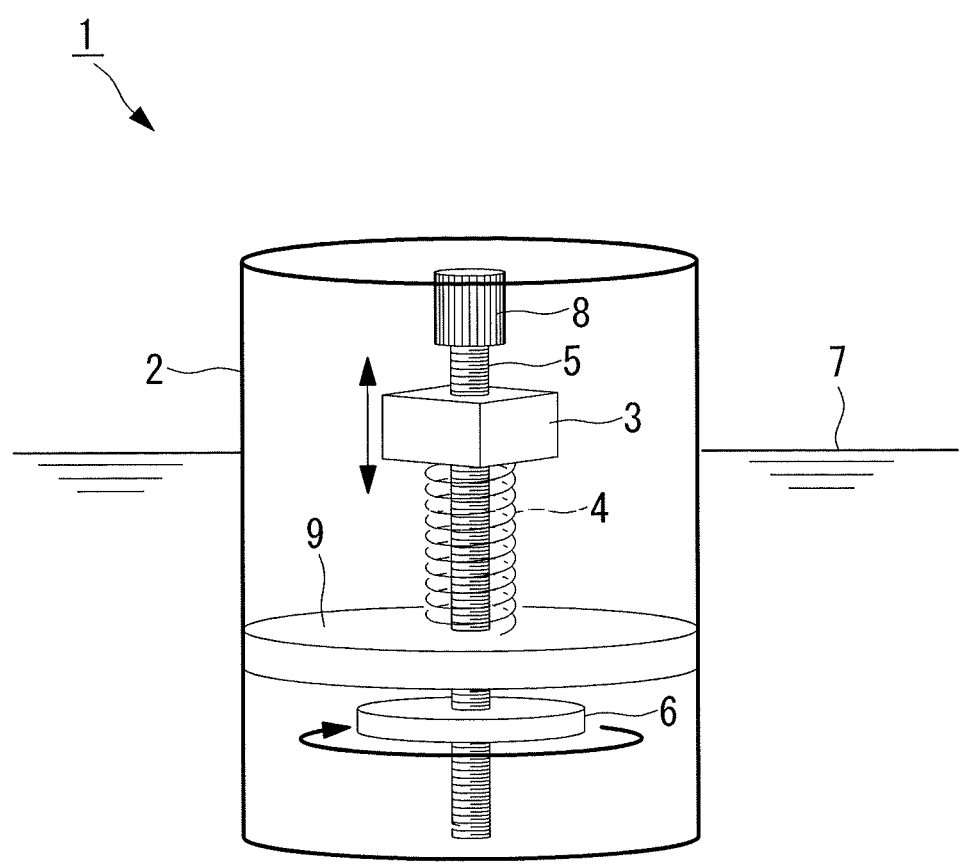
FIG. 1 is a perspective view showing, in outline, the configuration of a wave-power generator according to a first embodiment of the present invention.

FIG. 1 shows, in outline, the configuration of a wave-power generator according to the first embodiment.

A wave-power generator 1 is provided with a box-shaped floating body 2 that floats on a water surface 7 of the ocean with its upper portion exposed. The floating body 2 contains a weight (oscillating body) 3 that is installed in the floating body 2 via a spring 4, a ball screw shaft (rotating body) 5 that is rotated with respect to the weight 3, an additional-mass body 6 that is fixed to the ball screw shaft 5, and a generator 8 that is driven by the ball screw shaft 5, to generate power.

The weight 3 linearly reciprocates in the vertical direction at a predetermined natural frequency by receiving vertical oscillations of the floating body 2 that are produced by the heave of the water surface 7 caused by wave power. During the linear reciprocating motion, the weight 3 moves vertically via a guide (not shown), without rotating. The weight 3 is supported by the spring 4 so as to allow relative movement with respect to the floating body 2.

The ball screw shaft 5 is rotated about the axis thereof by the linear reciprocating motion of the weight 3. The additional-mass body 6 is fixed to a lower end of the ball screw shaft 5 so as to be rotated together with the ball screw shaft 5.

The generator 8 is provided at an upper end of the ball screw shaft 5 and is rotated in one direction or in the other direction by the rotation of the ball screw shaft 5, thereby generating power.

Figure 2:
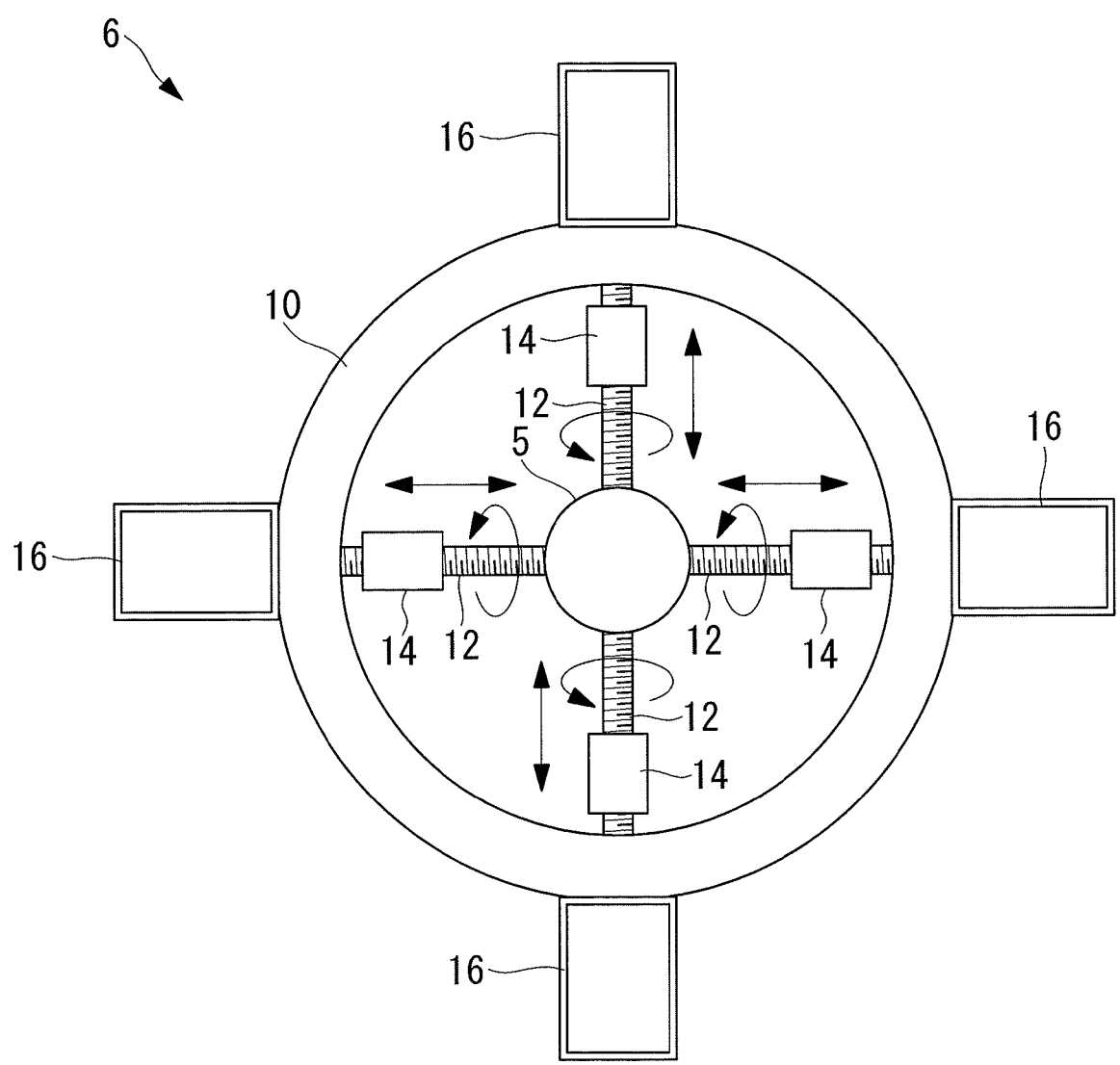
FIG. 2 is a plan view showing an additional-mass body shown in FIG. 1.

The additional-mass body 6 is provided in an air chamber located below a base plate 9. As shown in FIG. 2, the additional-mass body 6 includes a ring-shaped body 10 that has the same center of rotation as the ball screw shaft 5, four moving-weight ball screw shafts 12 that extend in vertical and horizontal directions in plan view as shown in FIG. 2, moving weights 14 that are provided on the moving-weight ball screw shafts 12, and movement motors (movement part) 16 that rotationally drive the moving-weight ball screw shafts 12 about the axes thereof.

One end of each of the moving-weight ball screw shafts 12 is fixed to the ball screw shaft 5, the moving ball screw shaft 12 radially extends and passes through the ring-shaped body 10, and the other end thereof is connected to the corresponding movement motor 16.

The moving weights 14 are displaced radially in response to the rotations of the moving-weight ball screw shafts 12.

The movement motors 16 are driven based on an instruction sent from a control section (not shown) and are fixed to the ring-shaped body 10.

In the additional-mass body 6, the ring-shaped body 10, the moving-weight ball screw shafts 12, the moving weights 14, and the movement motors 16 are integrally rotated together with the ball screw shaft 5, after the radial locations of the moving weights 14 are determined by the movement motors 16. Therefore, an additional mass of the additional-mass body 6 produced by the moment of inertia when it is rotated can be changed in response to the radial locations of the moving weights 14. Specifically, if the moving weights 14 are located at the radially outer sides (closer to the ring-shaped body 10), the centers of gravity move to the radially outer sides, thus increasing the moment of inertia to allow an increase in additional mass. In contrast, if the moving weights 14 are located at the radially inner sides (closer to the ball screw shaft 5), the centers of gravity move to the radially inner sides, thus reducing the moment of inertia to allow a reduction in additional mass.

In the wave-power generator 1, having the above-described configuration, when wave oscillations are received by the floating body 2, the weight 3 oscillates in the vertical direction at a predetermined natural frequency due to the additional mass of the additional-mass body 6 in which the radial locations of the moving weights 14 have been adjusted so as to correspond to the wave period. Then, based on a linear reciprocating motion caused by this oscillation, the generator 8 is driven to perform power generation, thus extracting electric power.

Next, the principle of operation of the wave-power generator 1 according to this embodiment will now be described with reference to FIG. 3.

Figure 3:
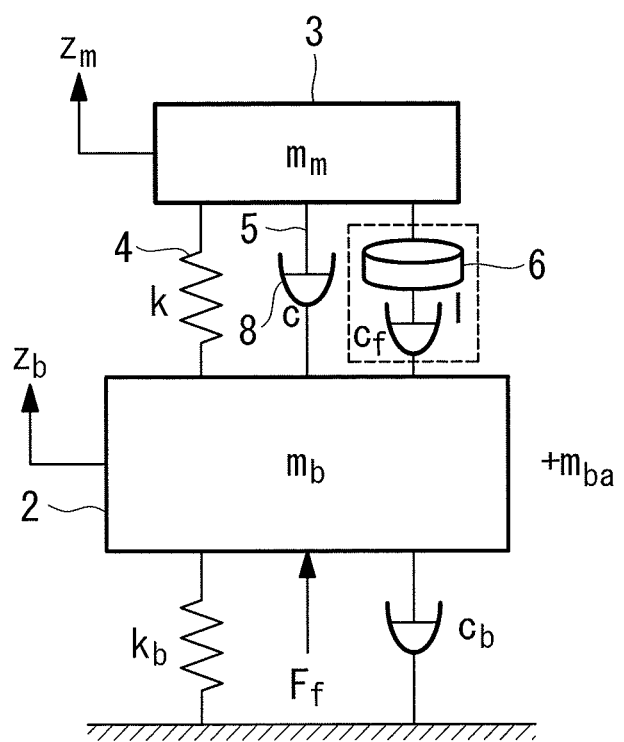
FIG. 3 is a diagram showing an oscillatory model of the wave-power generator shown in FIG. 1.

FIG. 3 shows an oscillatory system model of the wave-power generator 1 shown in FIG. 1.

In the figure, the reference symbols denote the following.

$z_m$: displacement of the weight 3

$z_b$: displacement of the floating body 2

$m_m$: mass of the weight 3

$m_b$: mass of the floating body 2 k: spring constant between the floating body 2 and the weight 3

$k_b$: floating spring constant c: damping constant (for example, the generator 8) between the floating body 2 and the weight 3

$c_b$: wave damping constant $c_f$: damping constant of the additional-mass body 6

I: moment of inertia of the additional-mass body 6

$m_{ba}$: added mass of water $F_f$: wave external force

Equations of motion are expressed as follows.

[Formula 3]

FLOATING BODY (4)

$$(m_b + m_{ba})\ddot{z}_b = -c_b\dot{z}_b - k_b z_b + F_f - F_{b \to m}$$

$F_{b \to m}$: FORCE TRANSFERRED FROM FLOATING BODY TO OSCILLATING BODY

OSCILLATING BODY (5)

$$m_m \ddot{z}_m = -c(\dot{z}_m - \dot{z}_b) - k(z_m - z_b) - F_{\Delta m} = F_{b \to m}$$

$F_{b \to m}$: FORCE TRANSFERRED FROM FLOATING BODY TO OSCILLATING BODY $F_{\Delta m}$: FORCE TRANSFERRED FROM OSCILLATING BODY TO ROTATING BODY -continued

INERTIA DISC (6)

$$I\ddot{\theta} = -c_f \dot{\theta} + F_{\Delta m} \times \frac{L}{2\pi}\eta$$

$F_{\Delta m}$: FORCE TRANSFERRED FROM OSCILLATING BODY TO ROTATING BODY
$L$: LEAD OF BALL SCREW
$\eta$: CONVERSION EFFICIENCY OF BALL SCREW Here, because the angle of rotation $\theta$ of the additional-mass body 6 is expressed as in the following Equation (7), Equation (6) can be transformed into the following Equation (8).

[Formula 4]

$$\theta = \frac{2\pi}{L}(z_m - z_b) \quad (7)$$

$$\Rightarrow \frac{1}{\eta}\left(\frac{2\pi}{L}\right)^2 I(\ddot{z}_m - \ddot{z}_b) + \frac{1}{\eta}\left(\frac{2\pi}{L}\right)^2 c_f(\dot{z}_m - \dot{z}_b) = F_{\Delta m} \quad (8)$$

Then, when Equation (8) is substituted into Equation (5), the following equation is obtained.

[Formula 5]

$$m_m \ddot{z}_m = -c(\dot{z}_m - \dot{z}_b) - k(z_m - z_b) - \frac{1}{\eta}\left(\frac{2\pi}{L}\right)^2 I(\ddot{z}_m - \ddot{z}_b) - \frac{1}{\eta}\left(\frac{2\pi}{L}\right)^2 c_f(\dot{z}_m - \dot{z}_b) = F_{b \to m}$$

Here,

[Formula 6]

$$\frac{1}{\eta}\left(\frac{2\pi}{L}\right)^2 I = \Delta m,$$

$$\frac{1}{\eta}\left(\frac{2\pi}{L}\right)^2 c_f = \Delta c$$

when the above settings are assumed, the following equation is obtained.

[Formula 7]

$$m_m \ddot{z}_m = -c(\dot{z}_m - \dot{z}_b) - \Delta m(\ddot{z}_m - \ddot{z}_b) - \Delta c(\dot{z}_m - \dot{z}_b) = F_{b \to m} \quad (9)$$

When Equation (9) is substituted into Equation (4), the following equation is obtained.

[Formula 8]

$$(m_b + m_{ba})\ddot{z}_b = -c_b \dot{z}_b - k_b z_b + F_f + c(\dot{z}_m - \dot{z}_b) + k(z_m - z_b) + \Delta m(\ddot{z}_m - \ddot{z}_b) + \Delta c(\dot{z}_m - \dot{z}_b) \quad (10)$$

When Equation (10) is rearranged, the following equation is obtained.

[Formula 9]

$$(m_b + m_{ba} + \Delta m)\ddot{z}_b - \Delta m \ddot{z}_m + (c_b + c + \Delta c)\dot{z}_b - (c + \Delta c)\dot{z}_m + (k_b + k)z_b - kz_m = F_f \quad (11)$$

Equation (11) is rearranged by using the left side and the middle part of Equation (9), the following equation is obtained.

[Formula 10]

$$-\Delta m \ddot{z}_b + (m_m + \Delta m)\ddot{z}_m - (c + \Delta c)\dot{z}_b + (c + \Delta c)\dot{z}_m - kz_b + kz_m = 0 \quad (12)$$

When Equation (11) and Equation (12) are expressed in matrix form, the following equation is obtained.

[Formula 11]

$$\begin{bmatrix} m_b + m_{ba} + \Delta m & -\Delta m \\ -\Delta m & m_m + \Delta m \end{bmatrix}\begin{bmatrix} \ddot{z}_b \\ \ddot{z}_m \end{bmatrix} + \begin{bmatrix} c_b + c + \Delta c & -c - \Delta c \\ -c - \Delta c & c + \Delta c \end{bmatrix}\begin{bmatrix} \dot{z}_b \\ \dot{z}_m \end{bmatrix} + \begin{bmatrix} k_b + k & -k \\ -k & k \end{bmatrix}\begin{bmatrix} z_b \\ z_m \end{bmatrix} = \begin{bmatrix} F_f \\ 0 \end{bmatrix} \quad (13)$$

Here,

[Formula 12]

$$M = \begin{bmatrix} m_b + m_{ba} + \Delta m & -\Delta m \\ -\Delta m & m_m + \Delta m \end{bmatrix},$$

$$C = \begin{bmatrix} c_b + c + \Delta c & -c - \Delta c \\ -c - \Delta c & c + \Delta c \end{bmatrix},$$

$$K = \begin{bmatrix} k_b + k & -k \\ -k & k \end{bmatrix},$$

$$x = \begin{bmatrix} z_b \\ z_m \end{bmatrix},$$

$$F = \begin{bmatrix} F_f \\ 0 \end{bmatrix}$$

when the above settings are assumed, the following equation is obtained.

[Formula 13]

$$M\ddot{x} + C\dot{x} + Kx = F \quad (14)$$

As described above, according to this embodiment, the following advantageous effects are afforded.

By changing the radial locations of the moving weights 14 of the additional-mass body 6, the moment of inertia I of the additional-mass body 6 is changed, thus allowing adjustment of an additional mass $\Delta m$. Thus, as can be seen from Equation (1) and Equation (14), because the natural frequency of the weight 3 can be adjusted, the weight 3 can be made to resonate in response to the changing wave period, thus resulting in an improvement in the capacity factor of the wave-power generator 1.

Figure 4:
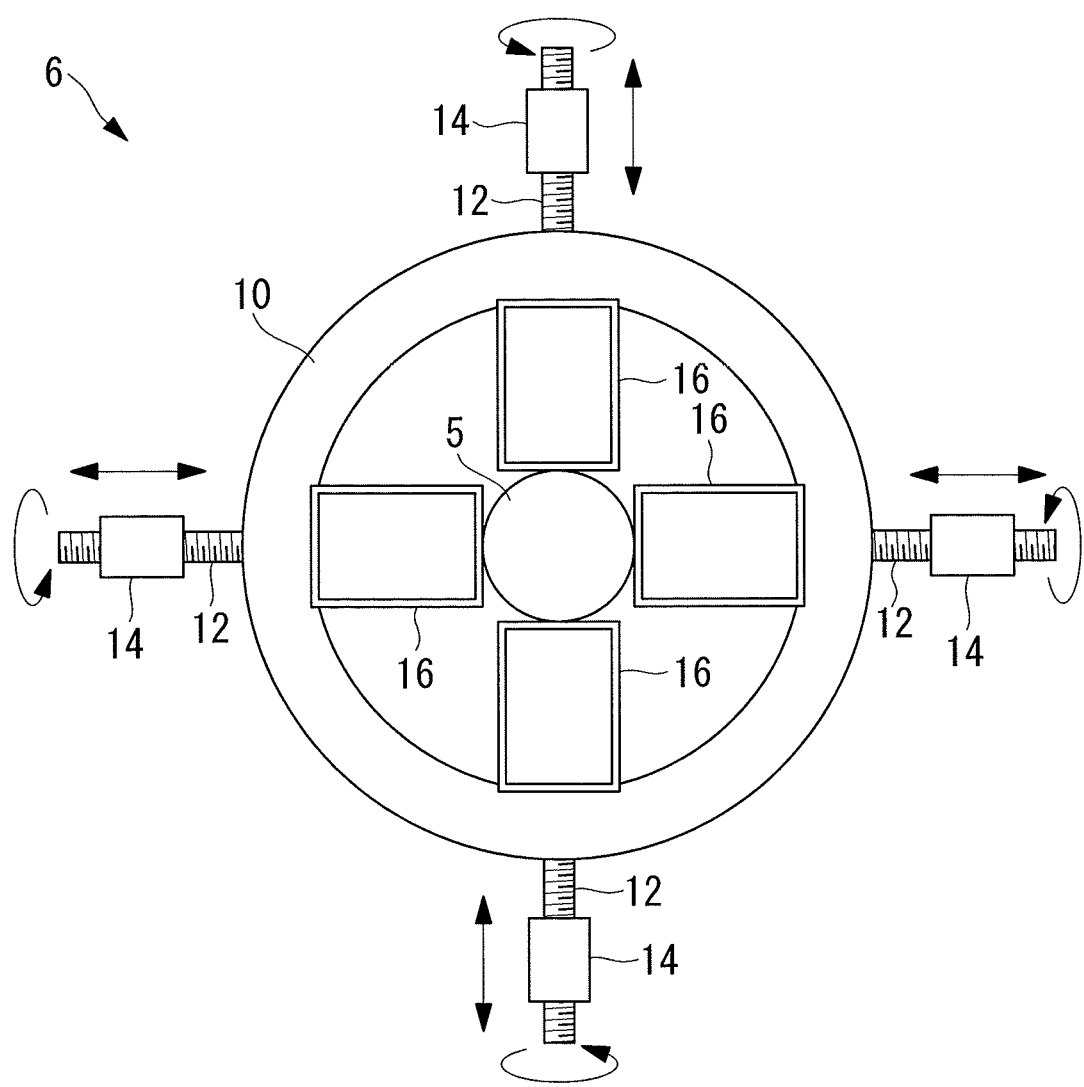
FIG. 4 is a plan view showing a first modification of the additional-mass body.
Figure 5:
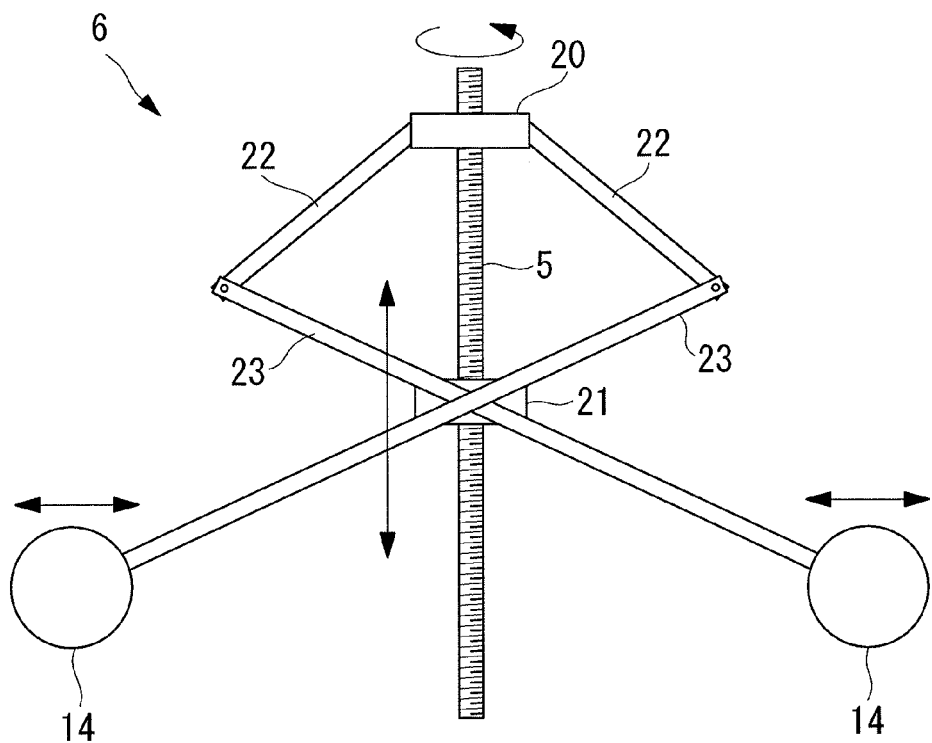
FIG. 5 is a side view showing a second modification of the additional-mass body.

Note that the configuration in which the additional mass $\Delta m$ of the additional-mass body 6 is adjusted by changing the radial locations of the moving weights 14 can be modified as shown in FIGS. 4 and 5.

In FIG. 4, the radial locations of the moving weights 14 are adjusted at the outer circumferential sides of the ring-shaped body 10 by using, as in FIG. 2, the moving-weight ball screw shafts 12 and the movement motors 16. By locating the moving weights 14 at the outer circumferential sides of the ring-shaped body 10, as shown in FIG. 4, the moment of inertia can be increased more than in the case shown in FIG. 2.

In FIG. 5, the radial locations of the moving weights 14 are adjusted by using a link mechanism. Specifically, a fixed part 20 that rotates together with the ball screw shaft 5 and a slider 21 that reciprocates in the axial direction of the ball screw shaft 5 with respect to the fixed part 20 are provided. Pivotable first arms 22 are symmetrically attached to the fixed part 20, and one end of each second arm 23 is pivotally attached to the other end of each of the first arms 22. The two second arms 23 are pin-supported at the slider 21 while crossing over each other, and the moving weights 14 are attached to the distal ends thereof. With this configuration, the slider 21 is moved forward and backward with respect to the fixed part 20 by an actuator (not shown), thereby making it possible to adjust the radial locations of the moving weights 14.

Second Embodiment

Figure 6:
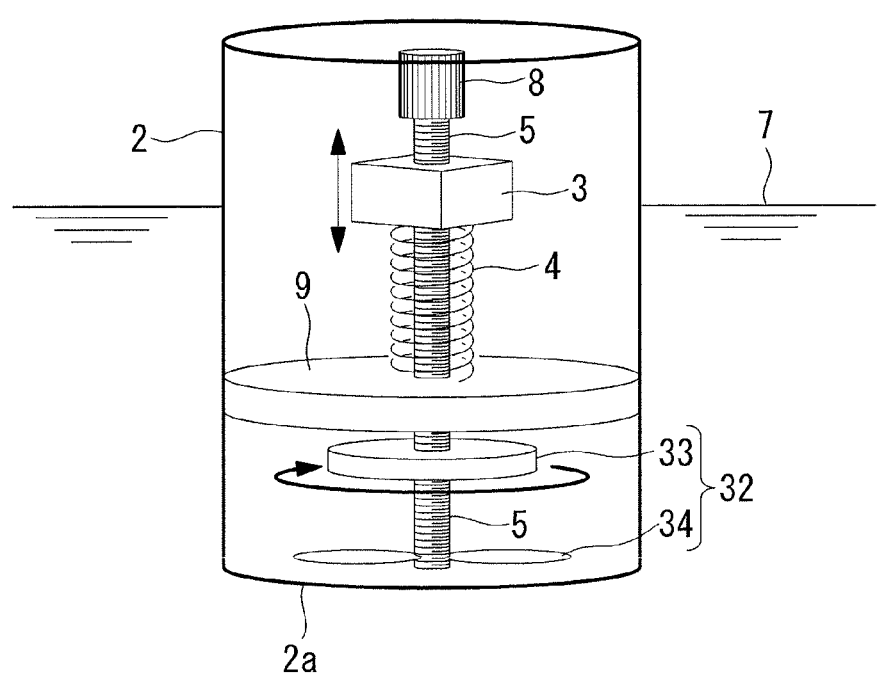
FIG. 6 is a perspective view showing, in outline, the configuration of a wave-power generator according to a second embodiment of the present invention.
Figure 7:
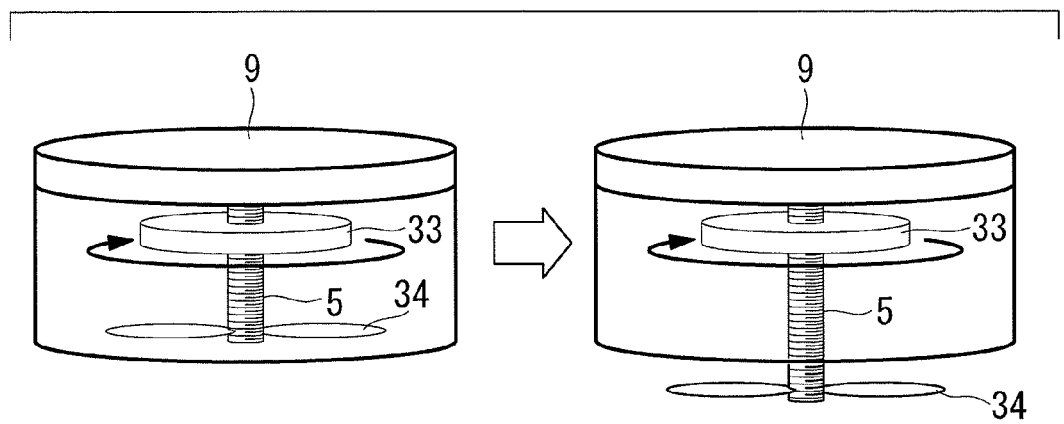
FIG. 7 is a perspective view showing forward-and-backward movement of blades of an additional-mass body shown in FIG. 6.

Next, a second embodiment of the present invention will be described with reference to FIGS. 6 and 7.

This embodiment is the same as the first embodiment in the configuration in which the weight 3 linearly reciprocates, and the generator 8 generates power; therefore, identical reference symbols are assigned, and a description thereof will be omitted. Since a wave-power generator 30 of this embodiment differs from that of the first embodiment in the configuration of the additional-mass body, a description thereof will be given.

An additional-mass body 32 is formed of blades 34 and a circular-plate-like inertia disc 33 that is rotated together with the ball screw shaft 5.

The inertia disc 33 is fixed to the ball screw shaft 5 so as to be rotated together with the ball screw shaft 5. Therefore, the additional mass obtained by the inertia disc 33 is the moment of inertia of a circular plate and has a fixed value.

Base ends of the blades 34 are fixed to a lower end portion of the ball screw shaft 5, and the blades 34 extend in radial directions. Although the number of blades 34 is two in FIG. 6, it may be three or more.

A lower end 2a of a cylindrical casing of the floating body 2 is an open end. Therefore, the space where the additional-mass body 32 is installed, specifically, the space below the base plate 9 in the floating body 2, serves as an air chamber, and the water surface is located at the position of the lower end 2a of the cylindrical casing of the floating body 2.

In this embodiment, the blades 34 are moved forward and backward with respect to the water below the lower end 2a of the floating body 2. Before the blades 34 are submerged, the additional mass obtained by the additional-mass body 32 includes the moment of inertia of the inertia disc 33 and the blades 34 and the resistance of the blades 34 to stirring of air. Then, when the blades 34 are submerged in the water, as shown in the right view of FIG. 7, the resistance added to the blades 34 is further increased due to the viscosity and the specific gravity of water, thus increasing the additional mass. In this way, the additional mass can be adjusted by moving the blades 34 of the additional-mass body 32 forward and backward with respect to the water.

Figure 8:
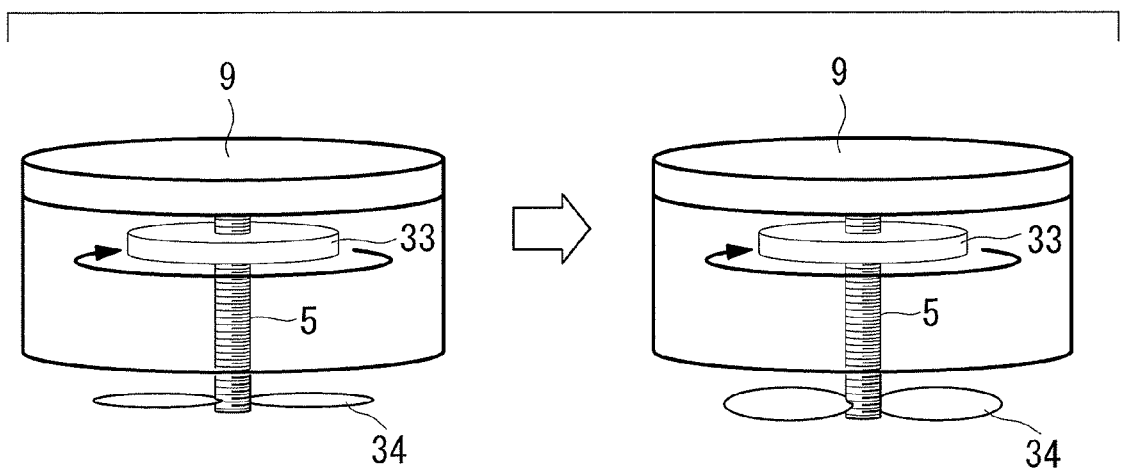
FIG. 8 is a perspective view showing a first modification of an additional-mass body shown in FIG. 7.

Furthermore, as shown in FIG. 8, the pitch angles of the blades 34 submerged in the water may be changed. Specifically, as shown in the right view of FIG. 8, when the pitch angles are changed so as to obtain larger angles of attack than those shown in the left view of FIG. 8, the water resistance is increased, thus further increasing the additional mass. In this way, when the angles of attack of the blades 34 with respect to the water are changed in the water, the degree of adjustment of the additional mass can be further increased.

Figure 9:
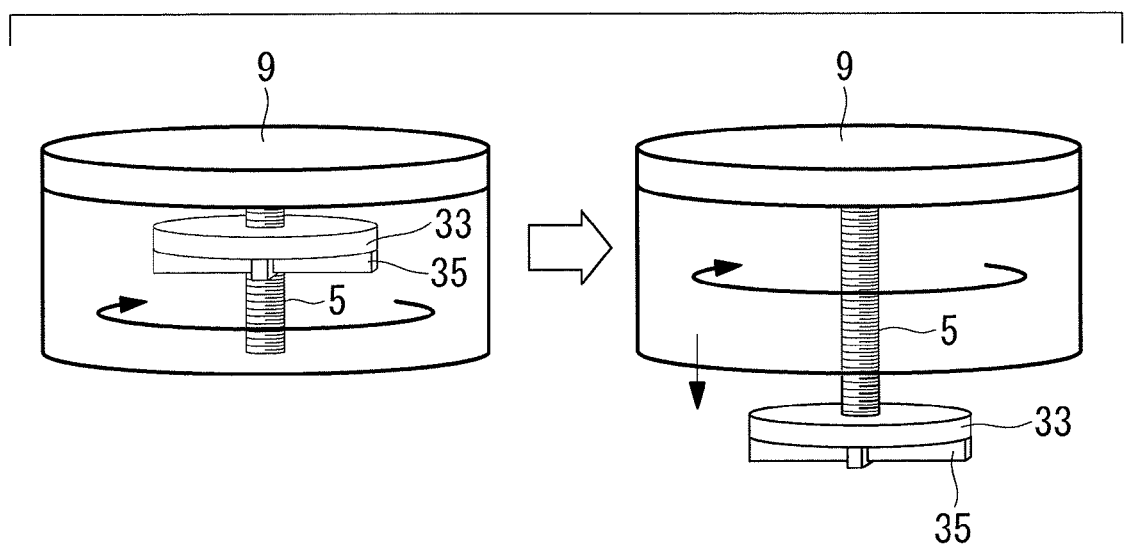
FIG. 9 is a perspective view showing a second modification of the additional-mass body shown in FIG. 7.

Furthermore, as shown in FIG. 9, fins 35 serving as additional resistance objects may be added to the inertia disc 33. Specifically, the fins 35 are attached so as to protrude downward from the lower surface of the inertia disc 33. The fins 35 are attached so as to form substantially an X-shape when the inertia disc 33 is viewed from below. Note that the shape of the attached fins 35 is not limited to the X-shape.

The fins 35 provided on the lower surface of the inertia disc 33 increase the resistance in the water, thus adjusting the additional mass. Furthermore, because the fins 35 are formed integrally with the inertia disc 33, the device configuration is simplified.

Figure 10:
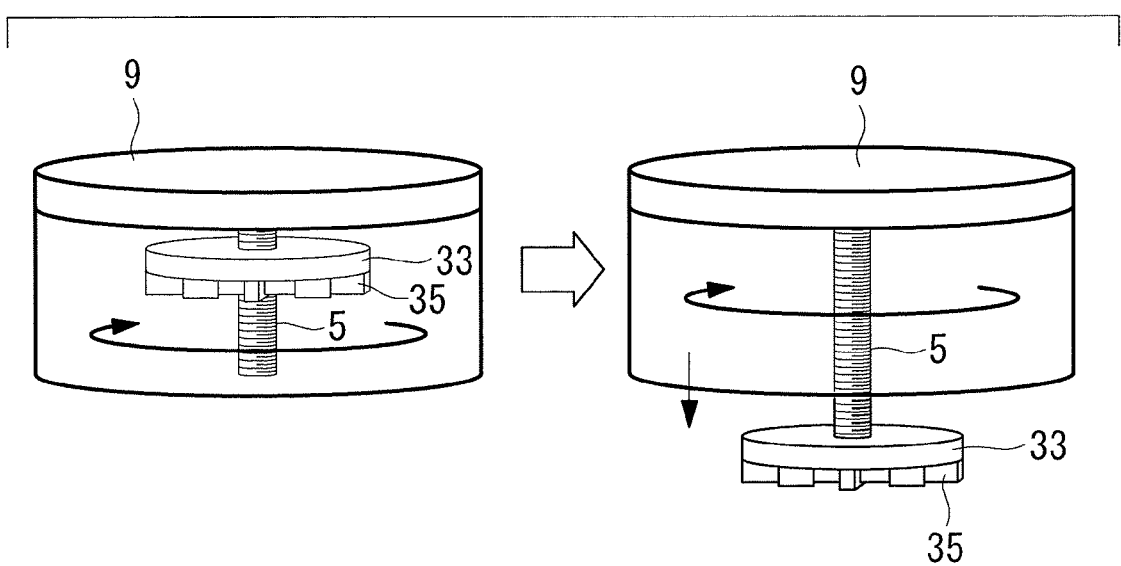
FIG. 10 is a perspective view showing a third modification of the additional-mass body of the additional-mass body shown in FIG. 7.

Furthermore, in addition to the configuration in FIG. 9, as shown in FIG. 10, it is also possible to divide the fins 35 attached to the lower surface of the inertia disc 33 into multiple pieces and to move them forward and backward individually. In this figure, the fins 35 are each radially divided into multiple pieces which can be moved forward and backward at individual radial locations. Thus, the fins 35 located at the radially outer sides are moved forward in order to obtain a larger additional mass, and the fins 35 located at the radially inner sides are moved forward in order to obtain a smaller additional mass. Thus, the degree of adjustment of the additional mass can be finely set.

Third Embodiment

A third embodiment of the present invention will be described below.

Figure 11:
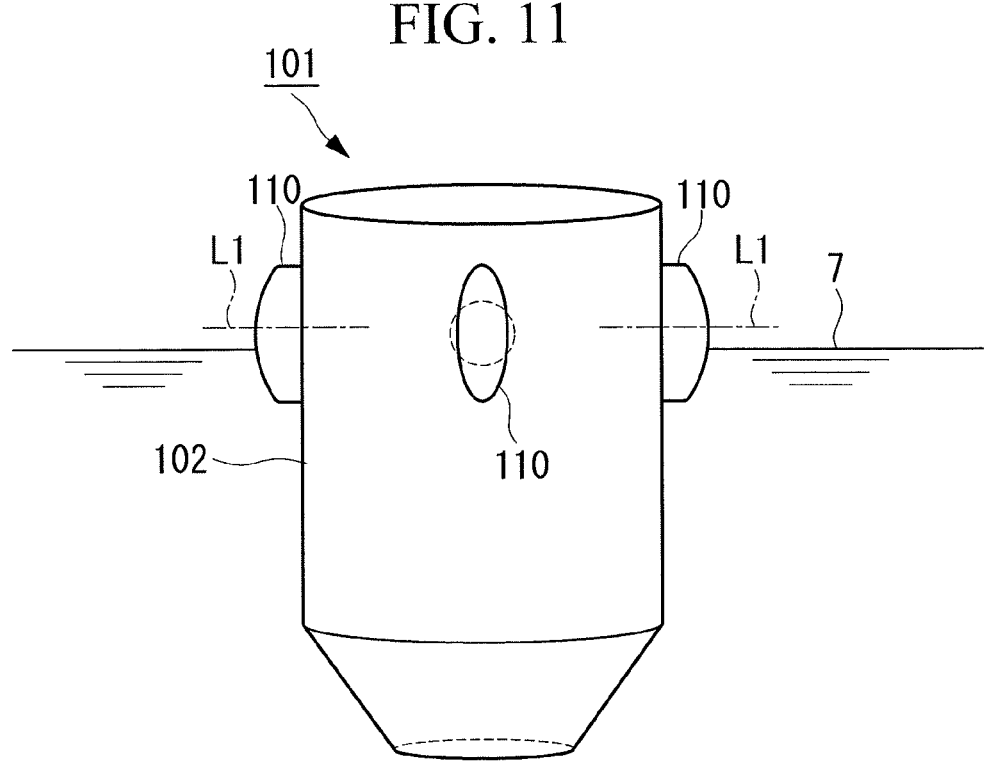
FIG. 11 is a perspective view showing a wave-power generator according to a third embodiment of the present invention.
Figure 12:
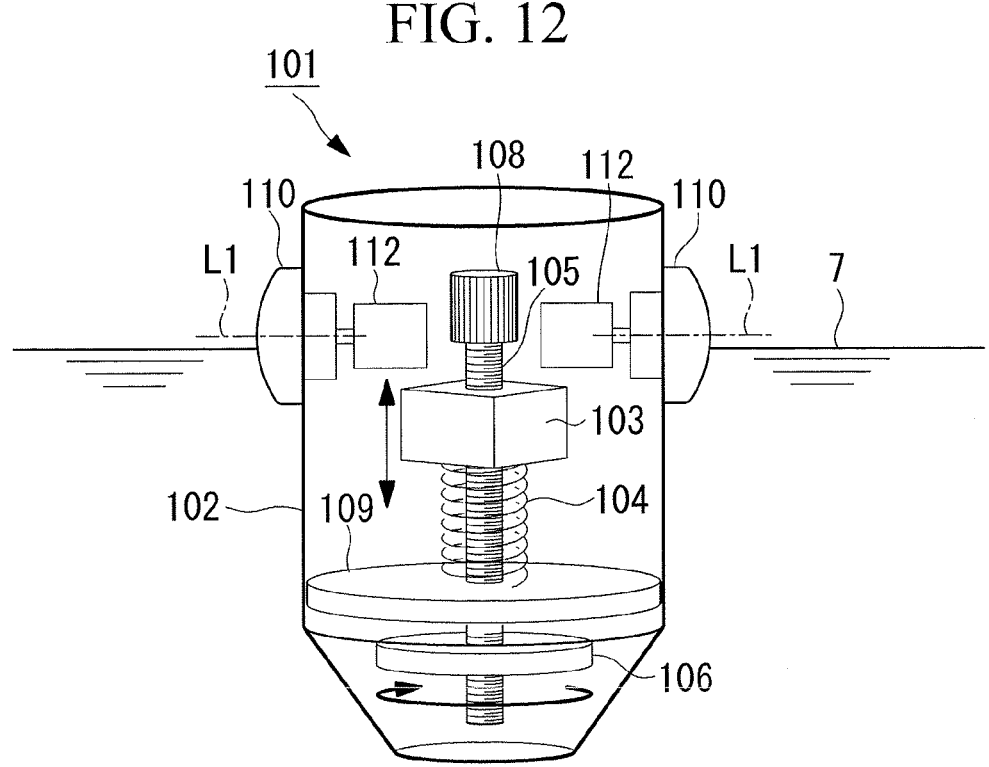
FIG. 12 is a partial cutaway perspective view showing the inside of the wave-power generator shown in FIG. 11.

FIGS. 11 and 12 show, in outline, the configuration of a wave-power generator of the third embodiment; wherein FIG. 11 is an external perspective view, and FIG. 12 is a cutaway perspective view.

This embodiment is the same as the first embodiment in the configuration in which the weight linearly reciprocates, and the generator generates power; therefore, a description thereof will be omitted. Note that, in this embodiment, a weight 103 is supported by a spring 104 whose lower end is fixed to a base plate 109, so as to allow relative movement with respect to a floating body 102.

Projecting members 110 that project outward from the side surface of the floating body 102 are provided at upper portions of the floating body 102. The vertical positions of the projecting members 110 are determined such that the water surface 7 is located somewhere in the vertical ranges of the projecting members 110. The projecting members 110 are provided on the outer circumference of the floating body 102 at a pitch of about 90°. However, the number of projecting members 110 and the interval (pitch) therebetween may be set as desired, and they are determined in response to the required floating-body cross-sectional area.

The projecting members 110 each have an elliptical shape or an oval shape when viewed from the side of the floating body 102. However, any shape, except a true circle, can be adopted.

Figure 13A:
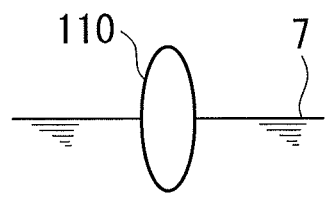
FIG. 13A is a side view showing an orientation change of a projecting member of the wave-power generator shown in FIG. 11.
Figure 13B:
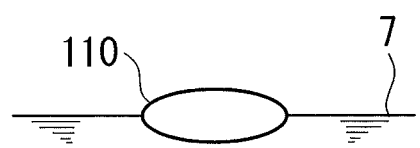
FIG. 13B is a side view showing an orientation change of the projecting member of the wave-power generator shown in FIG. 11.

The projecting members 110 are rotated about rotation axes L1 that extend in horizontal directions, by rotary motors 112 installed in the floating body 102. By driving the rotary motors 112, it is possible to make the long axis directions of the projecting members 110 match the vertical direction, as shown in FIG. 13A, or to make the long axis directions of the projecting members 110 match the horizontal direction, as shown in FIG. 13B. In this way, the floating spring coefficient of the floating body 102 is adjusted.

The floating spring coefficient $k_b$ of the floating body 102 can be expressed by the following equation (3).

$$k_b = \rho g A_b \quad (3)$$

Here, $\rho$ is the density of water (for example, seawater), g is gravitational acceleration, and $A_b$ is the floating-body cross-sectional area at the water surface.

As can be seen from Equation (3), the floating spring coefficient $k_b$ can be changed by changing the floating-body cross-sectional area $A_b$.

Therefore, when the projecting members 110 are located as shown in FIG. 13A, the floating-body cross-sectional area $A_b$ at the water surface 7 is reduced, thus reducing the floating spring coefficient. On the other hand, when the projecting members 110 are located as shown in FIG. 13B, the floating-body cross-sectional area $A_b$ at the water surface 7 is increased, thus increasing the floating spring coefficient. In this way, by rotating the projecting members 110 about the axes L1 and fixing them at predetermined angular positions, it is possible to change the floating-body cross-sectional area $A_b$, thus adjusting the floating spring coefficient $k_b$ and thus the natural frequency fn' (or the natural period) of the floating body 2 expressed by the following equation (2).

[Formula 14]

$$fn' = \frac{1}{2\pi}\sqrt{\frac{k_b}{m_b + m_{ba}}} \quad (2)$$

The angles of rotation of the projecting members 110 are determined by a control section (not shown). Specifically, the control section calculates the angles of rotation of the projecting members 110 based on a previously-obtained map or function from the wave period in an actual marine area measured by a wave-period measuring means, such as a wave height meter, and controls the rotary motors 112 to set the projecting members 110 at predetermined angles of rotation.

In a wave-power generator 101 having the above-described configuration, when wave oscillations are received by the floating body 102, the floating body 102 whose natural period has been adjusted in response to the wave period by the angles of rotation of the projecting members 110 oscillates, and, furthermore, the weight 103 oscillates in the vertical direction at a predetermined natural frequency due to the additional mass of an additional-mass body 106 that has been adjusted in response to the wave period, together with the floating body 102. Then, a generator 108 is driven based on the linear reciprocating motion caused by this oscillation, to generate power, thereby extracting electric power.

The principle of operation of the wave-power generator 101 according to this embodiment will now be described.

Figure 14:
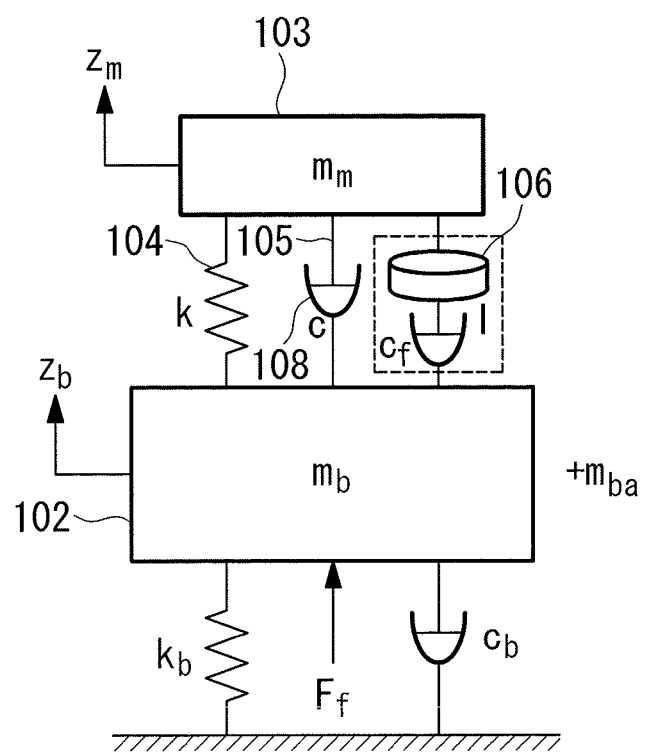
FIG. 14 is a diagram showing an oscillatory model of the wave-power generator shown in FIG. 11.

In accordance with FIG. 3 in the first embodiment, an oscillatory system model in this embodiment is shown in FIG. 14.

In the figure, the reference symbols denote the following.
$z_m$: displacement of the weight 103
$z_b$: displacement of the floating body 102
$m_m$: mass of the weight 103
$m_b$: mass of the floating body 102
k: spring constant between the floating body 102 and the weight 103
$k_b$: floating spring constant
c: damping constant (for example, the generator 108) between the floating body 102 and the weight 103
$c_b$: wave damping constant
$c_f$: damping constant of the additional-mass body 106
I: moment of inertia of the additional-mass body 106
$m_{ba}$: added mass of water
$F_f$: wave external force
Equations of motion thereof are the same as Equation (13) and Equation (14) in the first embodiment.

According to this embodiment, the following advantageous effects are afforded.

The plurality of projecting members 110 that project outward from the side of the floating body 102 are provided, and the floating-body cross-sectional area $A_b$ is adjusted by rotating the projecting members 110. Thus, it is possible to adjust the floating spring coefficient $k_b$ of the floating body, thus allowing adjustment of the natural frequency fn of the floating body. Therefore, because it is possible to adjust the natural frequency of the floating body such that the floating body oscillates in response to the changing wave period in the actual marine area and to effectively cause the weight 103 to linearly reciprocate, the capacity factor of the wave-power generator can be improved.

Furthermore, as can be seen from Equation (13) and Equation (14), the additional mass (Δm) is a mass added to the weight 103, which serves as the oscillating body. Thus, as can be seen from Equation (1), previously shown, in order to obtain the same natural frequency, when the additional mass (Δm) is added, the spring constant can be increased. Specifically, a short stiff spring 104 can be used. Thus, the wave-power generator 101 can be reduced in size.

Furthermore, it is possible to reduce the mass of the weight 103 by appropriately adjusting the mass of the additional-mass body 106, thus allowing a further reduction in size of the wave-power generator 101.

Note that this embodiment can be modified as follows.

Figure 15:
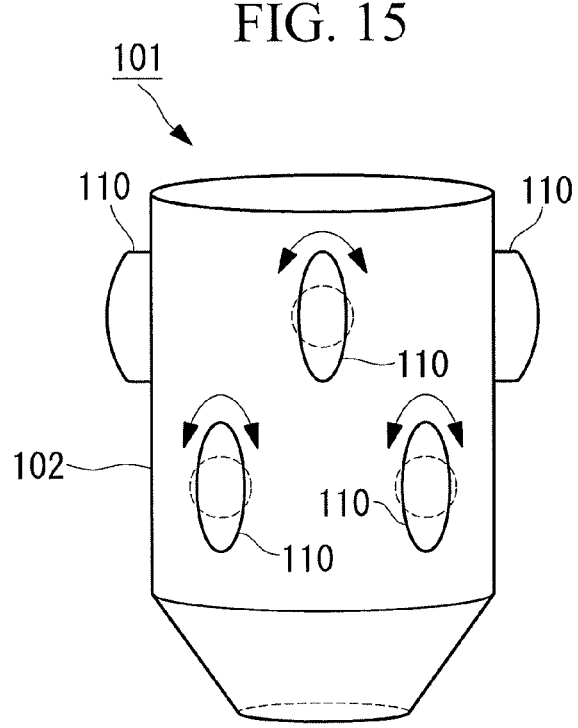
FIG. 15 is a perspective view showing a modification of the wave-power generator shown in FIG. 11.

As shown in FIG. 15, the projecting members 110 may be provided at a plurality of stages (in the figure, two stages) in the vertical direction. Thus, even when the relative position of the water surface 7 to the floating body 102 is changed, the floating-body cross-sectional area $A_b$ can easily adjusted. Furthermore, as shown in the figure, when the projecting members 110 are seen in plan view, the circumferential arrangement of the projecting members 110 that are located at one stage may be shifted from the circumferential arrangement of the projecting members 110 that are located at another stage.

Furthermore, the projecting members 110 that are submerged may be utilized to adjust the added mass of water $m_{ba}$ (see Equation (2)) on the floating body 102.

Furthermore, although the projecting members 110 of this embodiment are rotated about the horizontal axes L1 to change the floating-body cross-sectional area, instead of this, or, in addition to this, it is possible to adopt a configuration in which the projecting members 110 are moved forward and backward in the directions in which the projecting members 110 project (in radial directions of the floating body 102), to change the floating-body cross-sectional area.

Fourth Embodiment

Figure 16:
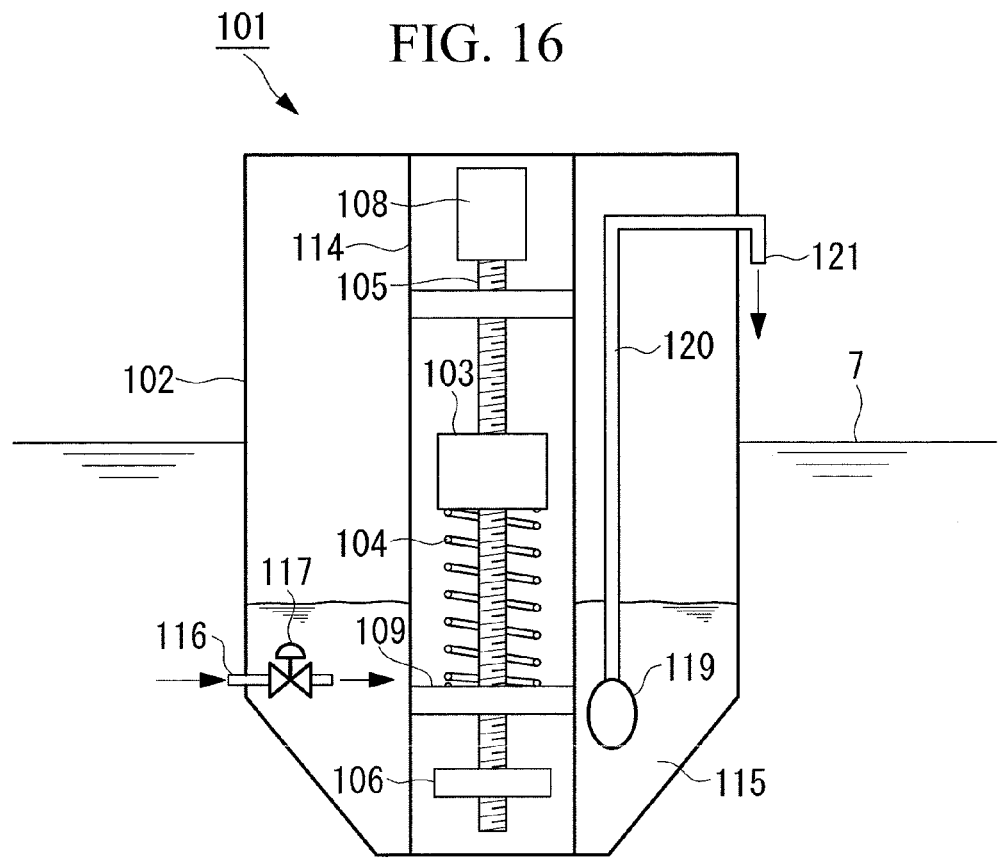
FIG. 16 is a longitudinal sectional view showing a wave-power generator according to a fourth embodiment of the present invention.

Next, a fourth embodiment of the present invention will be described with reference to FIG. 16.

This embodiment has an identical configuration in which the weight 103 linearly reciprocates by receiving the oscillations of the floating body 102, and the generator 108 extracts electric power; therefore, identical reference symbols are assigned to the same components, and a description thereof will be omitted. The present invention has a feature that the mass $m_b$ (see Equation (2)) of the floating body 102 is adjusted, thereby adjusting the natural frequency (or the natural period) of the floating body.

A tubular body 114 is provided upright at the center position of the floating body 102, and the tubular body 114 accommodates a mechanism for performing a linear reciprocating motion for power generation, constituted by the weight 103, the spring 104, a ball screw shaft 105, the additional-mass body 106, and the generator 108. The tubular body 114 is provided in a watertight manner so as to prevent water from entering the inside thereof from outside.

A water intake 116 and a water intake valve 117 are provided at a lower portion of the floating body 102. Seawater is guided to the floating body 102 via the water intake 116 and the water intake valve 117. A bottom portion of the floating body 102 serves as a water accommodating portion 115 for accommodating seawater, and the seawater taken into the water accommodating portion 115 is accumulated therein.

A pump 119 for pumping the accumulated seawater is provided at the bottom portion of the floating body 102. The seawater accumulated in the water accommodating portion 115 is pumped by the pump 119 and is discharged to the outside of the floating body 102 from a drain outlet 121 via a drain pipe 120. A hydraulic pump is suitable for use as the pump 119. Because a hydraulic pump is driven by water hammering action and requires no electric power, it has an advantage that electric power generated by using wave power is not wasted, and thus the power generation efficiency of the wave-power generator 101 is not reduced.

By combining the open-close movement of the water intake valve 117 and the operation of the pump 119, the level of holding water accumulated in the water accommodating portion 115 can be adjusted. Because the mass $m_b$ of the floating body 102 is changed by this holding water level, the natural frequency fn' of the floating body 102 can be adjusted (see Equation (2)).

The control section (not shown) controls the water intake valve 117 and the pump 119. Specifically, the control section calculates a desired holding water level based on a previously-obtained map or function from the wave period in the actual marine area obtained by the wave-period measuring means, such as a wave height meter, and controls the water intake valve 117 and the pump 119 to obtain the desired holding water level.

In this way, according to this embodiment, because the mass $m_b$ of the floating body 102 is adjusted by changing the holding water level accumulated in the floating body 102, the natural frequency (or the natural period) of the floating body 102 can be adjusted. Therefore, because it is possible to adjust the natural frequency of the floating body such that the floating body oscillates in response to the changing wave period in the actual marine area and to effectively cause the weight 103 to linearly reciprocate, the capacity factor of the wave-power generator can be improved.

Figure 17:
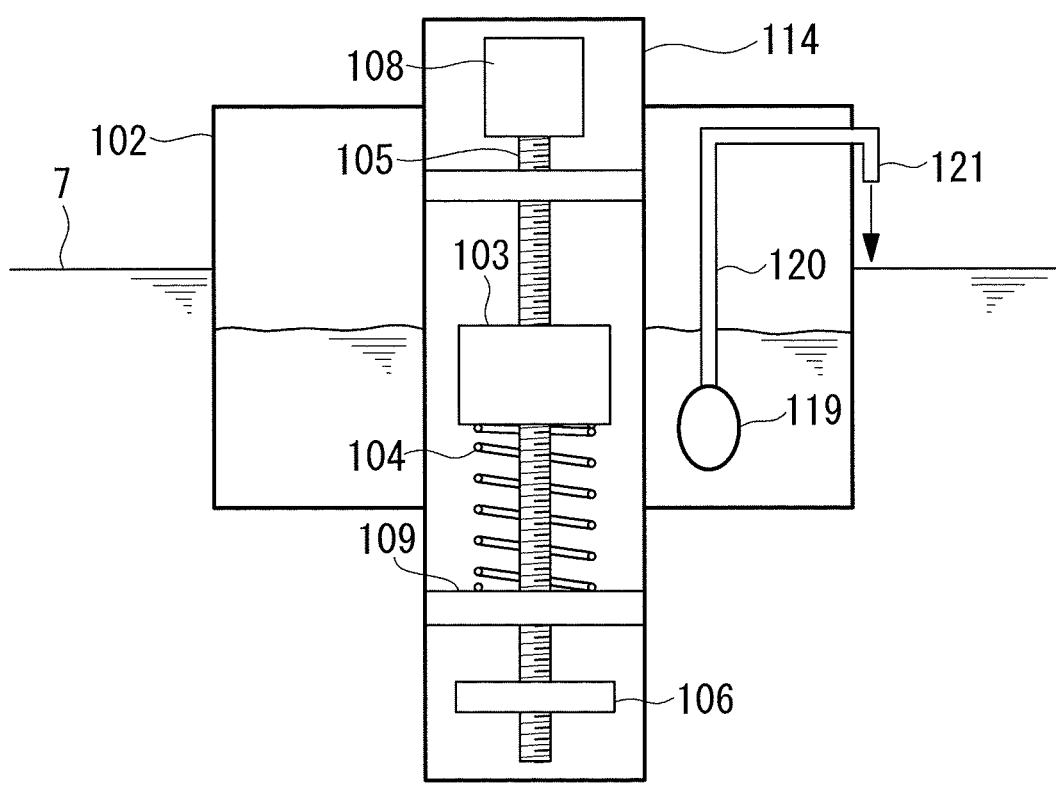
FIG. 17 is a longitudinal sectional view showing a modification of the wave-power generator shown in FIG. 16.

Note that this embodiment can be modified as shown in FIG. 17. Specifically, it is possible to adopt a configuration in which the tubular body 114 is inserted into the center of the floating body 102 in a watertight manner, an upper portion of the tubular body 114 is made to protrude upward from the floating body, and a lower portion of the tubular body 114 is made to protrude downward from the floating body 102. Thus, because it is possible externally access the tubular body 114 from the upper portion or the lower portion of the tubular body 114, this facilitates exchange or maintenance of the generator 108, the additional-mass body 106, etc.

Fifth Embodiment

Figure 18:
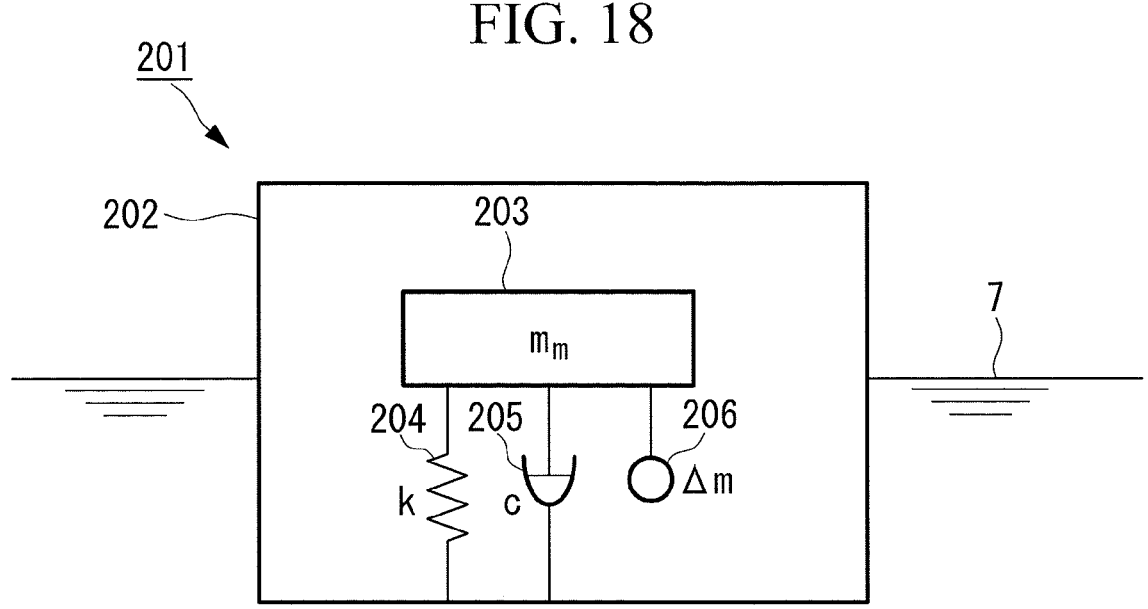
FIG. 18 is a view showing, in outline, the configuration of a wave-power generator according to a fifth embodiment of the present invention.

FIG. 18 shows, in outline, the configuration of a wave-power generator according to a fifth embodiment.

A wave-power generator 201 includes a floating body 202 that floats on the water surface 7 with its upper portion exposed, an oscillating body 203 that is installed in the floating body 202 via a spring 204, and an additional-mass body 206 that is directly attached to the oscillating body 203. The wave-power generator includes a generator (not shown) that is driven, based on the linear reciprocating motion of the oscillating body 203, to generate power.

The oscillating body 203 has a mass $m_m$, receives vertical oscillations of the floating body 202, which are produced by the heave of the water surface 7 caused by wave power, and linearly reciprocates in the vertical direction at a predetermined natural frequency. The oscillating body 203 is supported by the spring 204 so as to allow relative movement with respect to the floating body 202. Furthermore, a predetermined damping element 205 is provided between the floating body 202 and the oscillating body 203. The damping element 205 is represented by an oscillatory model and includes, for example, the resistance of the generator.

The additional-mass body 206 has a mass $\Delta m$, is directly attached to the oscillating body 203, and is detachable, for example. Furthermore, it is preferable that it can be exchanged with another additional-mass body 206 having a different mass, in response to the wave power status.

In this way, in the wave-power generator 201, when wave oscillations are received by the floating body 202, the oscillating body 203 oscillates in the vertical direction at an appropriately-tuned natural frequency. Then, based on the linear reciprocating motion caused by this oscillation, the generator is driven to perform power generation, thus extracting electric power.

Figure 19:
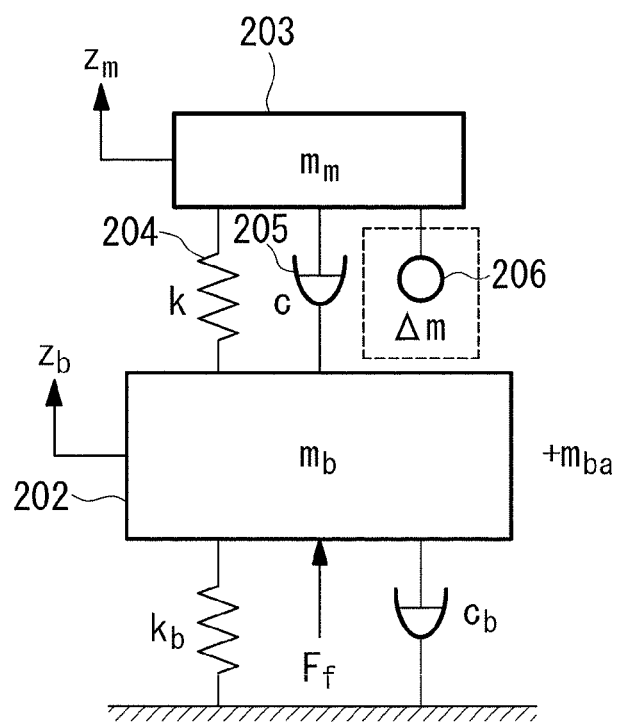
FIG. 19 is a diagram showing a model of the entire oscillatory system including a floating body shown in FIG. 18.

FIG. 19 shows an oscillatory system model of the wave-power generator 201 shown in FIG. 18.

In the figure, the reference symbols denote the following.
$z_m$: displacement of the oscillating body 203
$z_b$: displacement of the floating body 202
$m_m$: mass of the oscillating body 203
$m_b$: mass of the floating body 202
k: spring constant between the floating body 202 and the oscillating body 203
$k_b$: floating spring constant
c: damping constant between the floating body 202 and the oscillating body 203
$c_b$: wave damping constant
$\Delta m$: additional mass
$m_{ba}$: added mass of water
$F_f$: wave external force Equations of motion of the entire oscillatory system shown in FIG. 19 are expressed as the following equations.

[Formula 15]

FLOATING BODY (15)

$$(m_b + m_{ba})\ddot{z}_b = -c_b\dot{z}_b - k_b z_b + F_f - F_{b \to m}$$

$F_{b \to m}$: FORCE TRANSFERRED FROM
FLOATING BODY TO OSCILLATING BODY

OSCILLATING BODY + ADDITIONAL MASS (16)

$$(m_m + \Delta m)\ddot{z}_m = -c(\dot{z}_m - \dot{z}_b) - k(z_m - z_b) = F_{b \to m}$$

$F_{b \to m}$: FORCE TRANSFERRED FROM
FLOATING BODY TO OSCILLATING BODY

From Equation (16), Equation (15) is expressed as in the following equation.

[Formula 16]

$$(m_b + m_{ba})\ddot{z}_b = -c_b\dot{z}_b - k_b z_b + F_f + c(\dot{z}_m - \dot{z}_b) + k(z_m - z_b) \quad (17)$$

When Equation (16) and Equation (17) are rearranged, the following equation is obtained.

[Formula 17]

$$(m_b+m_{ba})\ddot{z}_b+(c_b+c)\dot{z}_b-c\dot{z}_m+(k_b+k)z_b-kz_m=F_f$$
$$(m_m+\Delta m)\ddot{z}_m-c\dot{z}_b+c\dot{z}_m-kz_b+kz_m=0 \quad (18)$$

The above equation is expressed in matrix form, the following equation is obtained.

[Formula 18]

$$\begin{bmatrix} m_b+m_{ba} & 0 \\ 0 & m_m+\Delta m \end{bmatrix}\begin{bmatrix} \ddot{z}_b \\ \ddot{z}_m \end{bmatrix} + \begin{bmatrix} c_b+c & -c \\ -c & c \end{bmatrix}\begin{bmatrix} \dot{z}_b \\ \dot{z}_m \end{bmatrix} + \begin{bmatrix} k_b+k & -k \\ -k & k \end{bmatrix}\begin{bmatrix} z_b \\ z_m \end{bmatrix} \quad (19)$$

$$= \begin{bmatrix} F_f \\ 0 \end{bmatrix}$$

Here,

[Formula 19]

$$M = \begin{bmatrix} m_b+m_{ba} & 0 \\ 0 & m_m+\Delta m \end{bmatrix},$$

$$C = \begin{bmatrix} c_b+c & -c \\ -c & c \end{bmatrix},$$

$$K = \begin{bmatrix} k_b+k & -k \\ -k & k \end{bmatrix},$$

$$x = \begin{bmatrix} z_b \\ z_m \end{bmatrix},$$

$$F = \begin{bmatrix} F_f \\ 0 \end{bmatrix}$$

when the above settings are assumed, the following equation is obtained.

[Formula 20]

$$M\ddot{x}+C\dot{x}+Kx=F \quad (20)$$

In this way, as can be seen from Equation (19) and Equation (20), the additional mass ($\Delta m$) of the additional-mass body 206 is a mass added to the oscillating body 203. Thus, as can be seen from Equation (1), previously shown, in order to obtain the same natural frequency, when the additional mass ($\Delta m$) is added, the spring constant can be increased. Specifically, a short stiff spring can be used. Thus, it is possible to shorten the spring, allowing a reduction in size of the wave-power generator.

Furthermore, it is possible to reduce the mass $m_m$ of the oscillating body by appropriately adjusting the mass $\Delta m$ of the additional-mass body, thus allowing a further reduction in size of the wave-power generator.

Sixth Embodiment

Next, a sixth embodiment of the present invention will be described. In this embodiment, the additional mass $\Delta m$ is utilized, like the fifth embodiment; however, an additional-mass body is attached to a rotating body that is rotated by an oscillating body, unlike the fifth embodiment in which the additional-mass body 206 is directly attached to the oscillating body 203.

Figure 20:
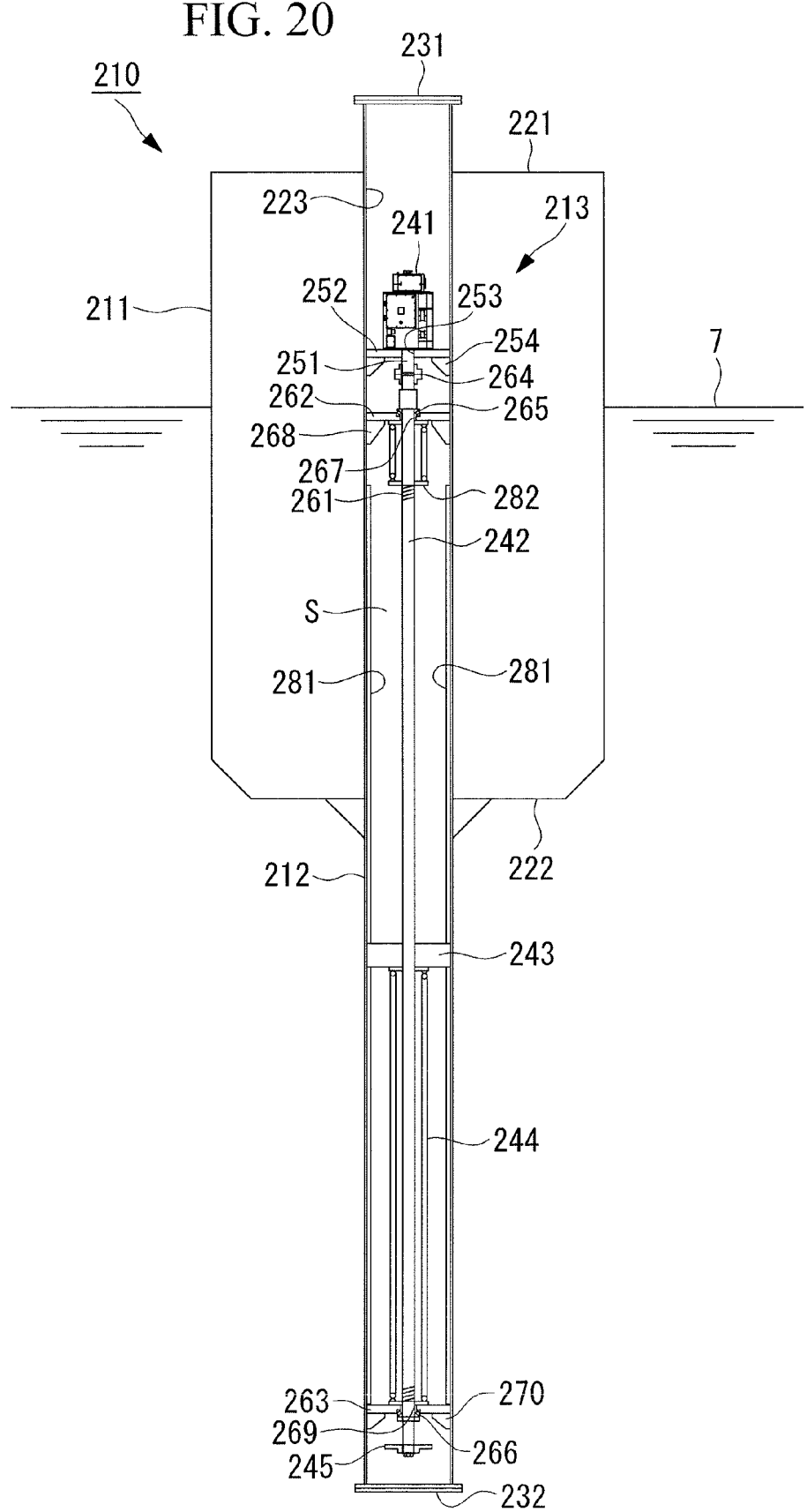
FIG. 20 is a sectional view of a wave-power generator according to a sixth embodiment of the present invention, viewed from the side.
Figure 21:
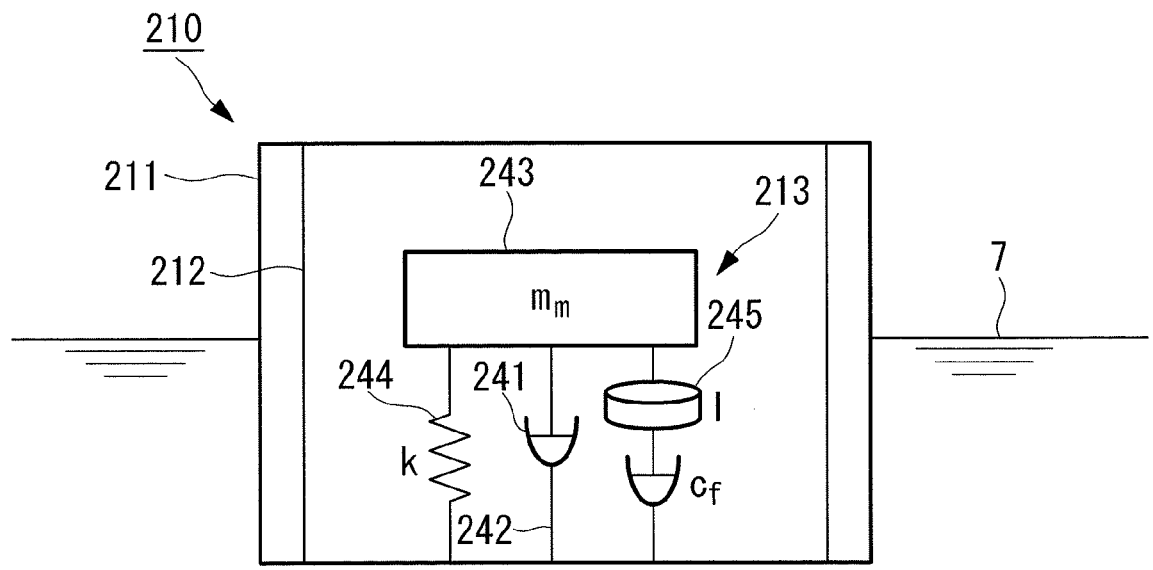
FIG. 21 is a view showing, in outline, the configuration of the wave-power generator shown in FIG. 20.

As shown in at least one of FIG. 20 and FIG. 21, a wave-power generator 210 of this embodiment includes a floating body 211, a casing (floating body) 212, and an electric-power extracting mechanism 213.

The floating body 211 is, for example, a hollow or solid member having a depth (length in the direction perpendicular to the plane of FIG. 20) of 5 m, a width (length in the horizontal direction in FIG. 20) of 5 m, and a height (length in the vertical direction in FIG. 20) of 20 m and having an almost rectangular shape. A through-hole 223 that communicates with an upper surface 221 and a lower surface 222 of the floating body 211 and that accommodates, in the inner portion (inside) thereof, an upper end portion (upper half) of the casing 212 is provided in a depthwise-and-widthwise center portion of the floating body 211. The through-hole 223 is formed so as to correspond to the upper end portion of the casing 212 accommodated in the through-hole 223.

The casing 212 is a hollow circular-column-shaped (cylindrical) or hollow square-column-shaped member, the upper end portion thereof is accommodated in the through-hole 223, and the electric-power extracting mechanism 213 is accommodated in the casing 212. Furthermore, an opening formed at an upper end of the casing 212 is closed with a (first) lid member 231, and an opening formed at a lower end of the casing 212 is closed with a (second) lid member 232, thus forming an enclosed space S in the casing 212.

The electric-power extracting mechanism 213 includes a generator 241, a ball screw shaft (rotating body: conversion mechanism) 242, a weight (oscillating body) 243, a spring 244, and an inertia disc (additional-mass body) 245.

The generator 241 generates electric power (electric energy) when a rotating shaft 251 is rotated in one direction or in the other direction, and is installed in the casing 212 via a (first) supporting plate (frame) 252.

The supporting plate 252 is a plate-like member formed such that an outer circumferential surface thereof corresponds to an inner circumferential surface of the casing 212, and a through-hole 253 that penetrates the supporting plate 252 in the plate-thickness direction and into which the rotating shaft 251 of the generator 241 is rotatably inserted is formed at the center portion of the supporting plate 252. Furthermore, the supporting plate 252 is fixed to the inner circumferential surface of the casing 212 via a bracket 254, and thus the generator 241 is installed in the enclosed space S at the upper end portion of the casing 212.

The ball screw shaft 242 is a bar-like member having an external thread portion 261 formed on the outer circumferential surface thereof and is installed in the casing 212 via a (second) supporting plate (frame) 262 and a (third) supporting plate (frame) 263. The upper end of the ball screw shaft 242 is coupled to a lower end of the rotating shaft 251 of the generator 241 via a coupling 264, the upper end portion of the ball screw shaft 242 is rotatably supported by the supporting plate 262 via a (first) bearing 265, and the lower end portion of the ball screw shaft 242 is rotatably supported by the supporting plate 263 via a (second) bearing 266.

Furthermore, the inertia disc 245 is attached (fixed) to the lower end of the ball screw shaft 242.

The upper supporting plate 262 is a plate-like member formed such that an outer circumferential surface thereof corresponds to the inner circumferential surface of the casing 212, and a through-hole 267 for accommodating the bearing 265 is provided at the center portion of the supporting plate 262. Furthermore, the supporting plate 262 is fixed, via a bracket 268, to the upper end portion of the casing 212 at a location lower than the supporting plate 252.

The lower supporting plate 263 is a plate-like member formed such that the outer circumferential surface thereof corresponds to the inner circumferential surface of the casing 212, and a through-hole 269 for accommodating the bearing 266 is provided at the center portion of the supporting plate 263. Furthermore, the supporting plate 263 is fixed to the lower end portion of the casing 212 via a bracket 270.

The weight 243 is an oscillating body that has a mass m and that vertically oscillates (linearly reciprocates) in the enclosed space S in the longitudinal direction (vertical direction) of the casing 212, without rotating about the axis of the ball screw shaft 242, along guide rails (conversion mechanisms) 281 provided on the inner circumferential surface of the casing 212 while extending in the longitudinal direction of the casing 212. Balls (not shown) are provided between the weight 243 and the ball screw shaft 242 (specifically, at an inner periphery portion of the weight 243), and the weight 243, the ball screw shaft 242, and the balls constitute a ball screw (conversion mechanism). Furthermore, balls (not shown) different from the balls constituting the ball screw are provided between the weight 243 and the guide rails 281 (specifically, at an outer periphery portion of the weight 243), and the weight 243, the guide rails 281, and the balls constitute a linear motion guide (conversion mechanism).

The upper end of the spring 244 is attached (fixed) to a lower surface of the weight 243, and the lower end thereof is attached (fixed) to an upper surface of the supporting plate 263.

The inertia disc 245 is a plate-like member that is attached to a lower end of the ball screw shaft 242, that is rotated together with the ball screw shaft 242, and that has a mass $\Delta$m. The inertia disc 245 has a circular shape or a polygonal shape in top view (bottom view).

Here, the spring constant k of the spring 244, the mass m of the weight 243, and the mass $\Delta$m of the inertia disc 245 are set (determined) such that the frequency fn falls within the range from 0.1 Hz to 0.5 Hz when they are substituted into Equation (1), previously shown.

Note that reference numeral 282 in FIG. 20 denotes a stopper that restricts upward movement of the weight 243.

Figure 22:
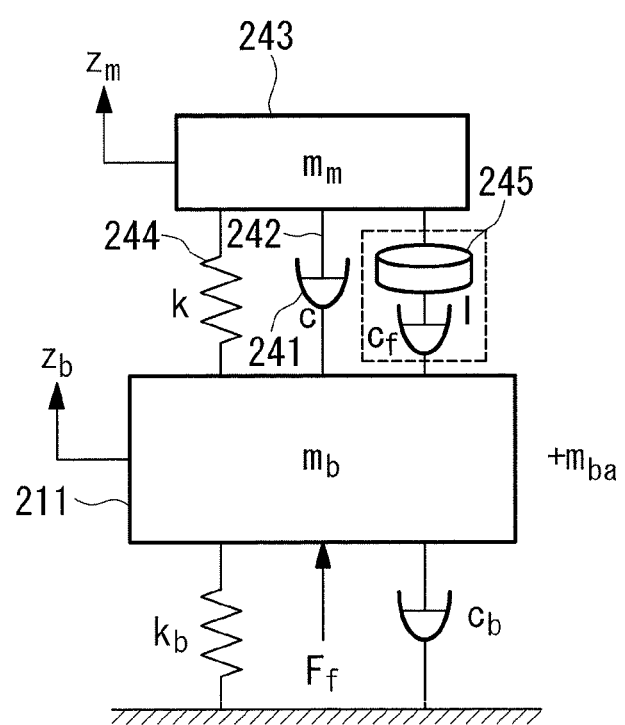
FIG. 22 is a view showing a model of the entire oscillatory system including a floating body shown in FIG. 20.

Next, an oscillatory system model of this embodiment is shown in FIG. 22.

In the figure, the reference symbols denote the following.
$z_m$: displacement of the weight 243
$z_b$: displacement of the floating body 211
$m_m$: mass of the weight 243
$m_b$: mass of the floating body 211
k: spring constant between the floating body 211 and the weight 243
$k_b$: floating spring constant
c: damping constant between the floating body 211 and the weight 243
$c_b$: wave damping constant
$c_f$: damping constant of the rotating body
I: moment of inertia of the rotating body
$m_{ba}$: added mass of water
$F_f$: wave external force Equations of motion are the same as Equation (13) and Equation (14) in the first embodiment.

As described above, according to this embodiment, the following advantageous effects are afforded.

According to the wave-power generator 210 of this embodiment, as can be seen from Equation (13) and Equation (14), the additional mass ($\Delta$m) is a mass added to the oscillating body. Thus, as can be seen from Equation (1), previously shown, in order to obtain the same natural frequency, when the additional mass ($\Delta$m) is added, the spring constant can be increased. Specifically, a short stiff spring 244 can be used. Thus, the wave-power generator 210 can be reduced in size.

Furthermore, it is possible to reduce the mass of the oscillating body by appropriately adjusting the mass of the additional-mass body, thus allowing a further reduction in size of the wave-power generator.

Furthermore, according to the wave-power generator 210 of this embodiment, because the inertia disc 245 attached to the ball screw shaft 242 gives an inertial force to the ball screw shaft 242, the moment of inertia of the ball screw shaft 242 can be increased, thus improving the effect of the additional mass.

Furthermore, according to the wave-power generator 210 of this embodiment, because the balls are provided between the weight 243 and the ball screw shaft 242, thus reducing the resistance (mechanical loss) produced when the weight 243 linearly reciprocates, the power generation efficiency can be further improved.

Furthermore, because the inertia disc 245 is attached to the ball screw shaft 242, and the moment of inertia of the inertia disc produced when it is rotated is utilized as an additional mass, the weight of the inertia disc 245 does not directly act on the spring 244 attached to the weight 243. Thus, the free length and the deflection of the spring 244 can be reduced, thus allowing a further reduction in size of the wave-power generator 210.

Furthermore, according to the wave-power generator 210 of this embodiment, because the balls are provided between the guide rails 281 and the weight 243, thus reducing the resistance (mechanical loss) produced when the weight 243 linearly reciprocates, the power generation efficiency can be further improved.

Note that the present invention is not limited to the above-described embodiment and can be appropriately modified and changed as needed.

Figure 23:
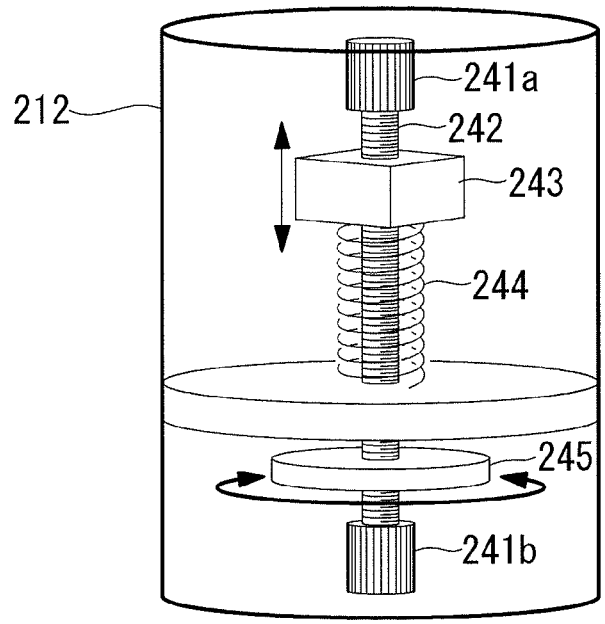
FIG. 23 is a cutaway perspective view showing a configuration in which generators are provided at upper and lower portions of a ball screw shaft.

For example, although the generator 241 is provided at only one end (upper end) of the ball screw shaft 242 in the sixth embodiment shown in FIG. 20, generators 241a and 241b may be provided at both upper and lower ends of the ball screw shaft 242, as shown in FIG. 23. Thus, even when the direction of rotation of the ball screw shaft 242 is changed, the generators 241a and 241b can be driven, without requiring a complicated mechanism.

For example, it is assumed that the ball screw shaft 242 is rotated clockwise when the weight 243 moves upward, and the ball screw shaft 242 is rotated counterclockwise when the weight 243 moves downward. In this case, the upper generator 241a is rotationally driven only in a clockwise direction via a one-way clutch to perform power generation, and the lower generator 241b is rotationally driven only in a counter-clockwise direction via a one-way clutch to perform power generation. With such a configuration, the upper generator 241a generates power when the weight 243 moves upward, and the lower generator 241b generates power when the weight 243 moves downward, thus making it possible to perform power generation at either of the generators 241a and 241b whenever the weight 243, which linearly reciprocates, moves.

Seventh Embodiment

Figure 25:
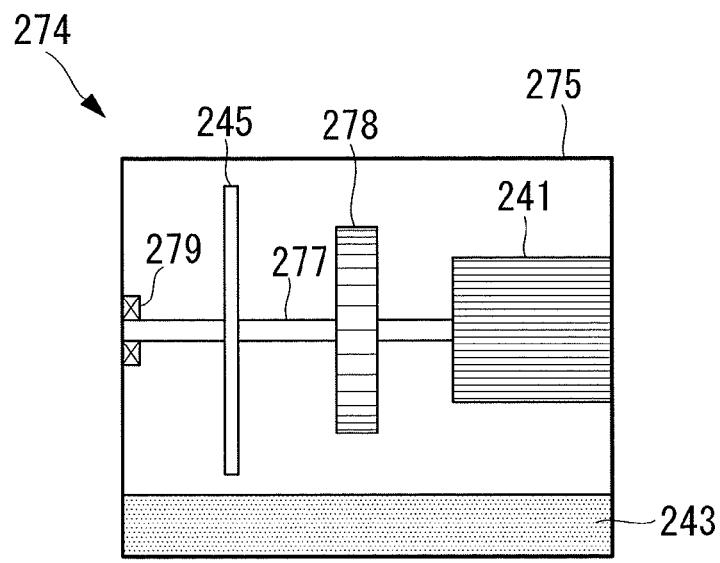
FIG. 25 is a longitudinal sectional view showing an oscillating-body unit shown in FIG. 24.
Figure 26:
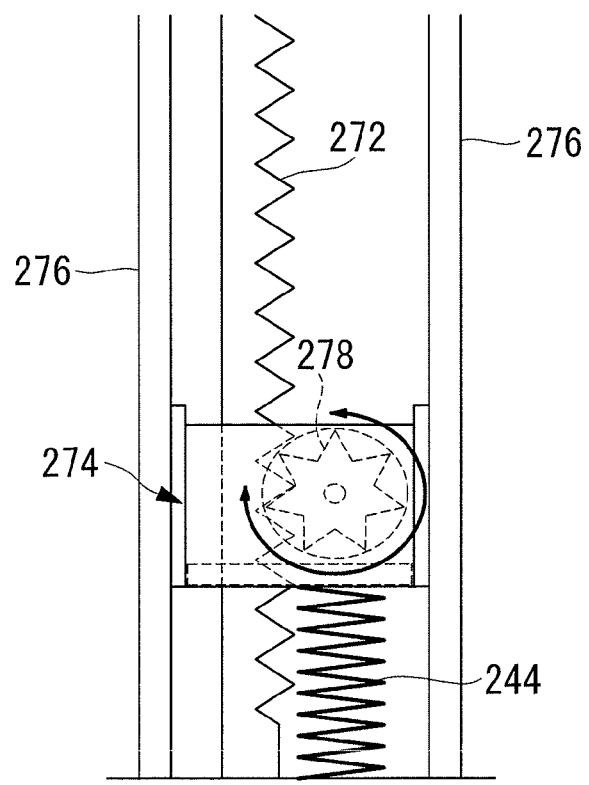
FIG. 26 is a side sectional view showing the conversion mechanism shown in FIG. 24.

Next, a seventh embodiment of the present invention will be described with reference to FIGS. 24 to 26.

In the above-described sixth embodiment, a description has been given of an example conversion mechanism in which the weight 243 linearly reciprocates in the vertical direction, and the ball screw shaft 242 is rotated; however, this embodiment adopts another conversion mechanism in which a rack and a pinion are used. Note that the configuration in which the weight (oscillating body) linearly reciprocates in response to the oscillations of the floating body, performing power generation, is the same as those in the above-described embodiments; therefore, a description thereof will be omitted.

Figure 24:
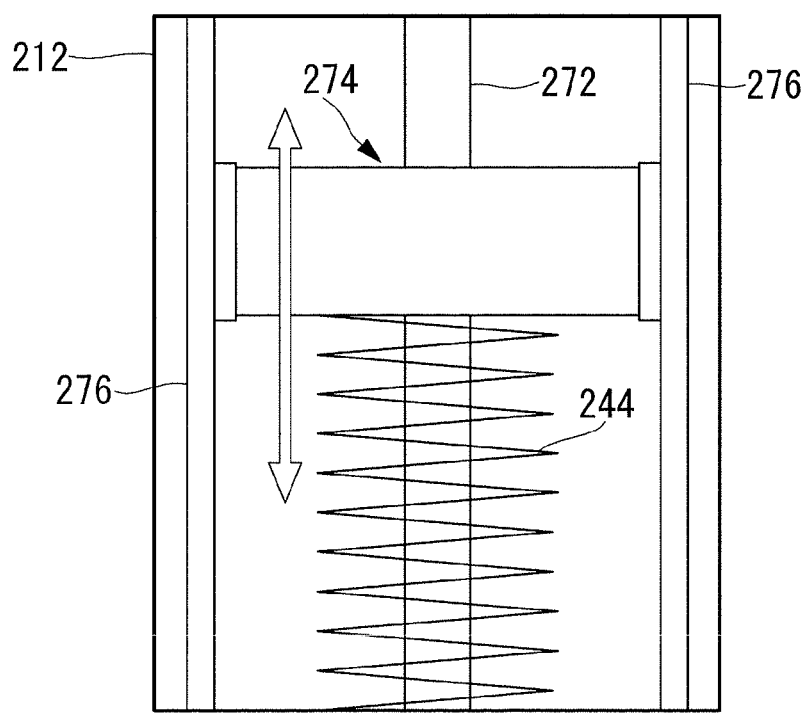
FIG. 24 is a longitudinal sectional view showing, in outline, the configuration of a conversion mechanism of a wave-power generator according to a seventh embodiment of the present invention.

As shown in FIG. 24, a rack 272 that extends in the vertical direction is provided in the casing 212. The rack 272 is fixed to the casing 212.

Guide rails 276 that vertically guide an oscillating-body unit 274 serving as the oscillating body are provided at both sides of the rack 272. The guide rails 276 are fixed to the casing 212. Balls (not shown) are provided between the guide rails 276 and the oscillating-body unit 274, thus reducing the resistance (mechanical loss) produced when the oscillating-body unit 274 linearly reciprocates.

The oscillating-body unit 274 is supported from below by the spring 244. The upper end of the spring 244 is fixed to the lower surface of the oscillating-body unit 274, and the lower end of the spring 244 is fixed to the lower end of the casing 212. As shown in FIG. 25, the oscillating-body unit 274 includes, in a chassis 275, the generator 241, the weight 243, and the inertia disc (additional-mass body) 245, as in the sixth embodiment.

The weight 243 is fixed to a bottom portion of the chassis 275. The mass of the weight 243 is appropriately adjusted in response to the wave period in the actual marine area. Note that the position where the weight 243 is installed is not particularly limited as long as the weight 243 is attached to the chassis 275. Furthermore, the weight 243 may be eliminated by adjusting the mass of the chassis 275.

The generator 241 and the inertia disc 245 are fixed to a rotating shaft (rotating body) 277 that extends in the horizontal direction. One end (left end in the figure) of the rotating shaft 277 is fixed to the chassis 275 via a radial bearing 279. The generator 241 is fixed to the chassis 275 at the other end (right end in the figure) of the rotating shaft 277. A pinion 278 is fixed to the rotating shaft 277, and the rotating shaft 277 is rotated by the pinion 278. As shown in FIG. 26, the pinion 278 is engaged with the rack 272 and is rotated in response to the vertical displacement relative to the rack 272.

In this way, according to this embodiment, with the configuration constituted by the rack and the pinion, electric power can be extracted from the linear reciprocating motion of the oscillating body.

Figure 27:
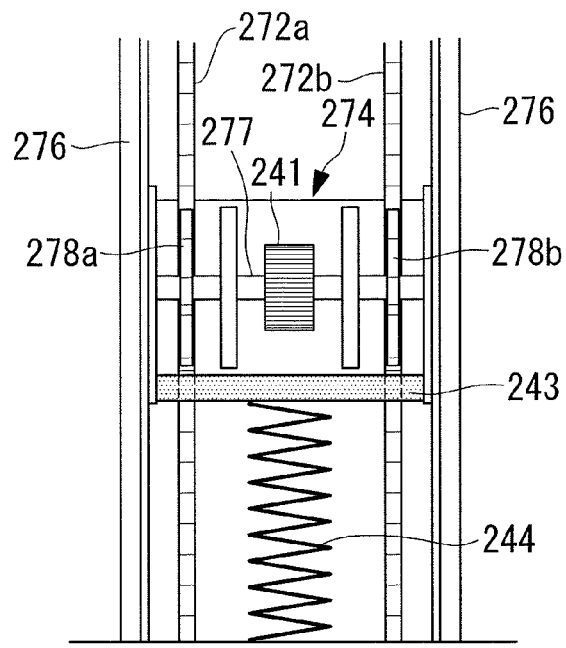
FIG. 27 is a longitudinal sectional view showing a modification of the seventh embodiment of the present invention.

Note that this embodiment can be modified, as shown in FIG. 27. As shown in the figure, two racks 272a and 272b are provided at left and right portions, and pinions 278a and 278b are engaged with the racks 272a and 272b, respectively. The pinions 278a and 278b are attached to the single rotating shaft 277, and the rotating shaft 277 causes the generator 241 located at the center to generate power.

Note that the wave-power generator of the present invention is not limited to the configuration shown in the sixth embodiment or the seventh embodiment in which the linear reciprocating motion is converted to rotational motion by means of the ball screw or by means of the rack and the pinion, to perform power generation, and it can be applied to any configuration in which driving is caused based on the linear reciprocating motion of the oscillating body (weight), to perform power generation. For example, the driving force transferred to the generator may be directly obtained from the oscillating body (for example, a linear generator), may be indirectly obtained via another mechanism, or may be obtained via the additional-mass body.

Eighth Embodiment

Next, an eighth embodiment of the present invention will be described with reference to FIGS. 28 to 31.

In this embodiment, it is possible to utilize not only a heave motion in the vertical direction, as in the above-described embodiments, but also (roll, pitch, surge, and sway) motions in other directions. Note that the configuration in which the weight (oscillating body) linearly reciprocates in response to the oscillations of the floating body, thus leading to power generation, is the same as those in the above-described embodiments; therefore, a description thereof will be omitted.

Figure 28:
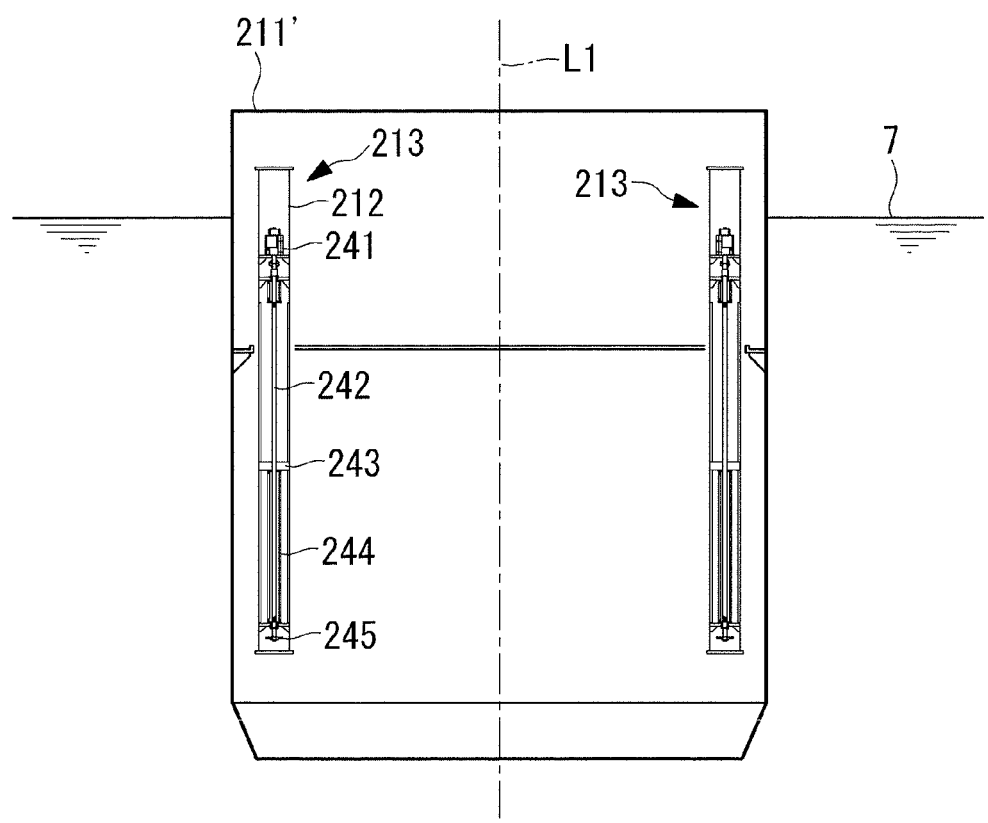
FIG. 28 is a longitudinal sectional view showing, in outline, the configuration of a conversion mechanism of a wave-power generator according to an eighth embodiment of the present invention.
Figure 29:
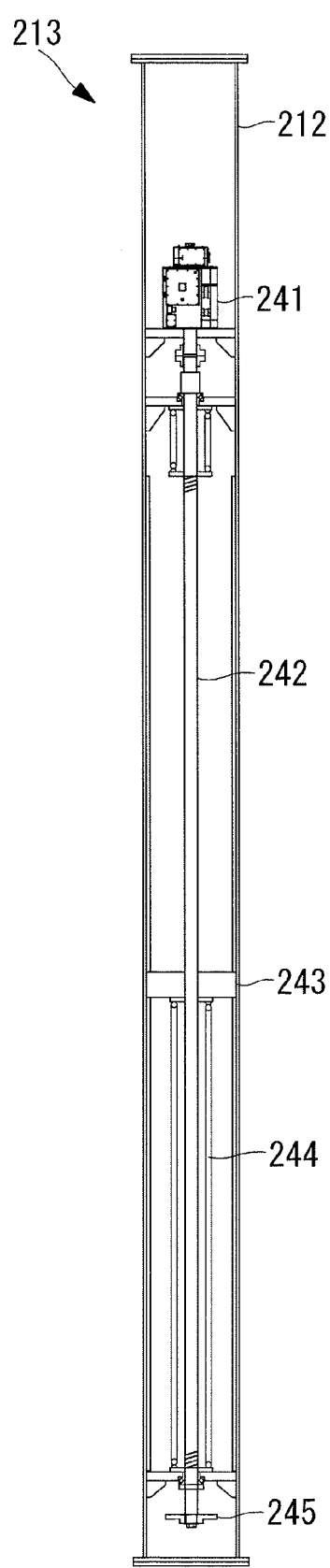
FIG. 29 is a longitudinal sectional view showing an electric-power extracting mechanism shown in FIG. 28.

As shown in FIG. 28, a plurality of electric-power extracting mechanisms 213 are installed in a fixed manner in a floating body 211'. As shown in a magnified form in FIG. 29, each of the electric-power extracting mechanisms 213 has the same configuration as the electric-power extracting mechanism 213 of the sixth embodiment described using FIG. 20. However, in this embodiment, the casing 212 of the electric-power extracting mechanism 213 is a container accommodated in the floating body 211', unlike the sixth embodiment in which it serves as the floating body itself.

As in the sixth embodiment, the electric-power extracting mechanism 213 includes, as main components, the generator 241, the ball screw shaft 242, the weight 243, and the inertia disc 245.

Figure 30:
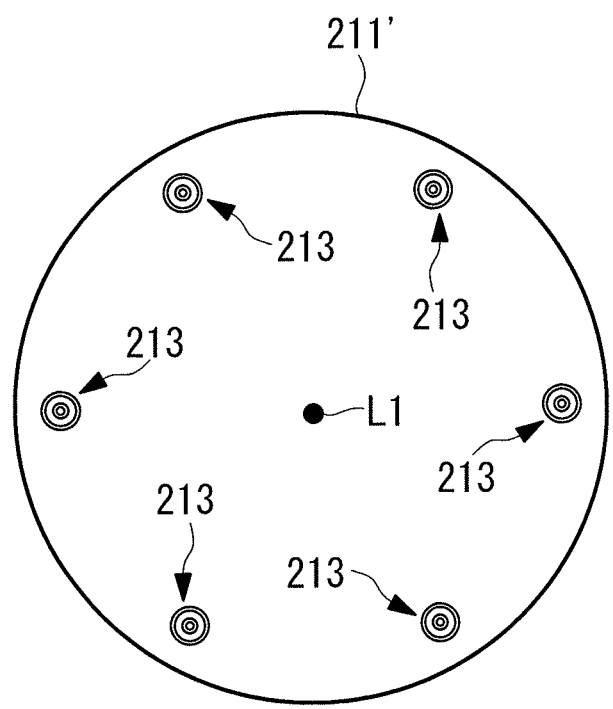
FIG. 30 is a transverse sectional view showing the wave-power generator shown in FIG. 28.

As shown in FIG. 30, the floating body 211' is a container having a cylindrical shape in cross section. The electric-power extracting mechanisms 213 are installed at almost regular intervals around the outer circumference of the floating body 211'. The electric-power extracting mechanisms 213 are each installed in the vertical direction, and electric power is extracted through the linear reciprocating motion of the weight 243 in the vertical direction.

In this way, in this embodiment, the electric-power extracting mechanisms 213 are placed at positions offset from the vertical axis L1 that passes through the center of gravity of the floating body 211'. Therefore, the weights 243 in the electric-power extracting mechanisms 213 can be made to oscillate not only with heave (in the direction of the vertical axis L1) produced when the floating body 211' oscillates but also with roll and pitch, which are motion components about axes perpendicular to the vertical axis L1. Thus, it is possible to efficiently convert wave energy into motion energy to perform power generation.

Figure 31:
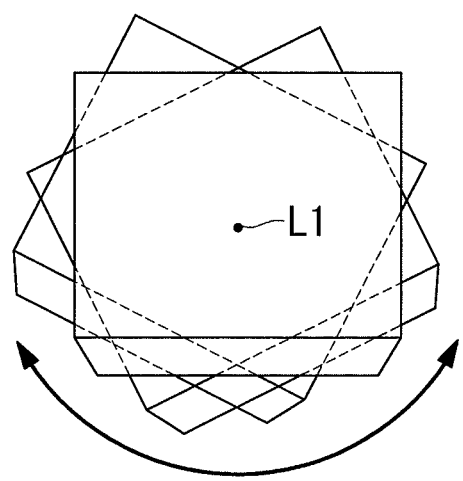
FIG. 31 is a view showing a yawing motion.
Figure 32:
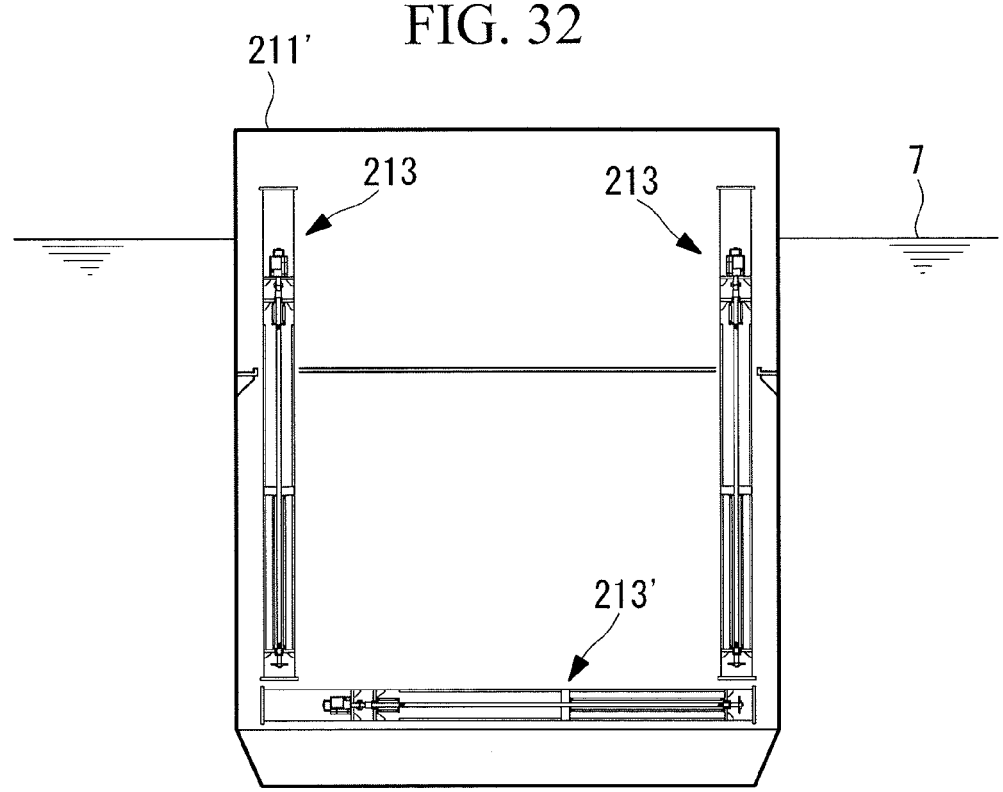
FIG. 32 is a longitudinal sectional view showing a first modification of the wave-power generator shown in FIG. 28.
Figure 33:
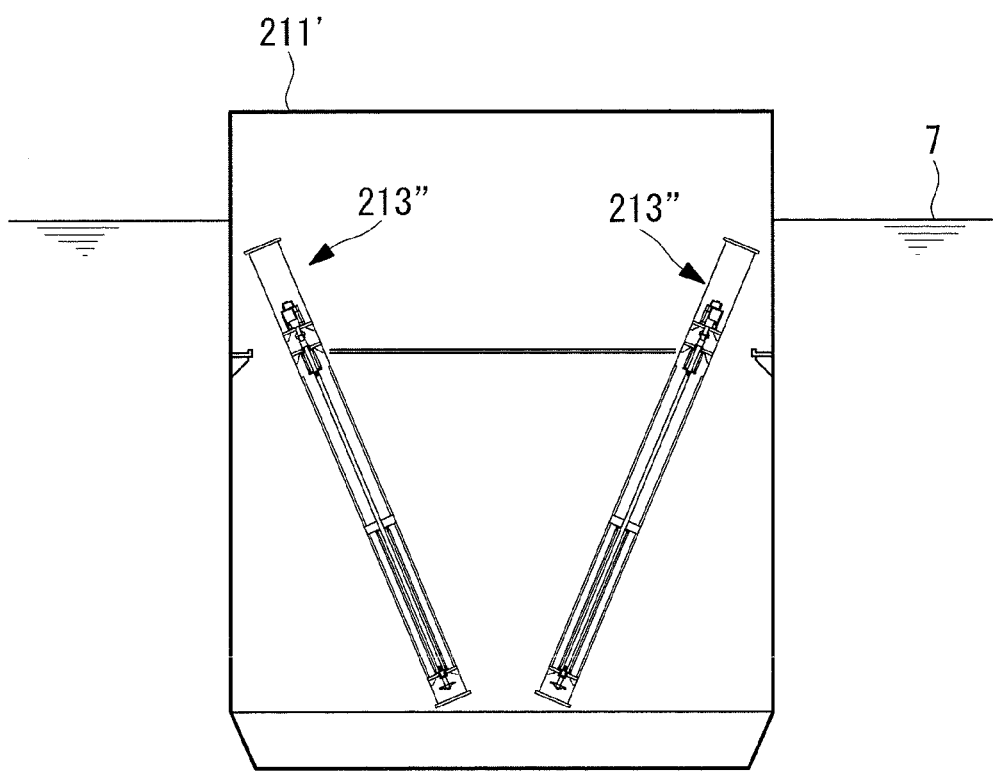
FIG. 33 is a longitudinal sectional view showing a second modification of the wave-power generator shown in FIG. 28.

Furthermore, in order to utilize the yaw about the vertical axis L1, as shown in FIG. 31, an electric-power extracting mechanism 213' can be placed with its axis kept in the horizontal direction, as shown in FIG. 32. Furthermore, as shown in FIG. 33, it is also possible to place electric-power extracting mechanisms 213" with their axes inclined such that a motion component in every direction (heave, sway, surge, roll, pitch, and yaw) can be extracted.

As described above, according to this embodiment, without limitation to the case in which the weight (oscillating body) 203 or 243 linearly reciprocates in the vertical direction, as in the fifth to seventh embodiments, it is possible utilize a roll or pitch motion component by placing the electric-power extracting mechanisms 213 at positions offset from the vertical axis L1, which passes through the center of gravity of the floating body 211'; therefore, it is possible to efficiently convert wave energy into motion energy to perform power generation. Furthermore, the configuration in which the electric-power extracting mechanism 213' is placed in the horizontal direction to make the weight 243 linearly reciprocate in the horizontal direction or the configuration in which the electric-power extracting mechanisms 213" are inclined with respect to the vertical direction to make the weights 243 linearly reciprocate in inclined directions is also adopted; therefore, it is possible to convert wave energy into motion energy more efficiently to perform power generation.

The invention claimed is:

1. A wave-power generator comprising:
   an oscillating body that is installed in a floating body via a spring and that linearly reciprocates in response to a fluctuation of a water surface;
   a generator that generates power by being driven on the basis of the linear reciprocating motion of the oscillating body;
   an additional-mass body for adding an additional mass to a mass of the oscillating body;
   a conversion mechanism that converts the linear reciprocating motion of the oscillating body to rotational motion; and
   a rotating body that is rotated by a torque extracted via the conversion mechanism,
   wherein
   the generator is provided at an upper end of the rotating body and is rotated by rotation of the rotating body to generate power,
   the additional-mass body is attached to the rotating body, and
   the additional-mass body is attached so as to be rotated together with the rotating body and is moved forward and backward with respect to water.

2. The wave-power generator according to claim 1, wherein the additional mass of the additional-mass body is adjustable.

3. The wave-power generator according to claim 1, wherein the additional-mass body is attached so as to be rotated together with the rotating body and includes a moving weight that can be moved in a radial direction from the center of rotation and a movement part for moving the moving weight in the radial direction.

4. The wave-power generator according to claim 1, wherein the conversion mechanism is formed of a ball screw or is formed of a rack and a pinion.

5. The wave-power generator according to claim 1, wherein a guide rail is provided in the floating body in the direction of the linear reciprocating motion, a ball is provided between the guide rail and the oscillating body, and the guide rail, the oscillating body, and the ball constitute a linear motion guide.

6. The wave-power generator according to claim 1, further comprising an electric-power extracting mechanism that includes the oscillating body and the generator and has an axis in the direction of the linear reciprocating motion of the oscillating body,
   wherein the electric-power extracting mechanism is placed such that the axis thereof matches a vertical axis that passes through the center of gravity of the floating body.

7. The wave-power generator according to claim 1, further comprising an electric-power extracting mechanism that includes the oscillating body and the generator and has an axis in the direction of the linear reciprocating motion of the oscillating body,
   wherein the electric-power extracting mechanism is placed such that the axis thereof is located at a position displaced from a vertical axis that passes through the center of gravity of the floating body, parallel to the vertical axis.

8. The wave-power generator according to claim 1, further comprising an electric-power extracting mechanism that includes the oscillating body and the generator and has an axis in the direction of the linear reciprocating motion of the oscillating body,
   wherein the electric-power extracting mechanism is placed such that the axis thereof is kept in a horizontal direction.

9. The wave-power generator according to claim 1, further comprising an electric-power extracting mechanism that includes the oscillating body and the generator and has an axis in the direction of the linear reciprocating motion of the oscillating body,
   wherein the electric-power extracting mechanism is placed such that the axis thereof is inclined with respect to the vertical direction.

10. The wave-power generator according to claim 1, wherein the additional-mass body is provided with a blade whose base end portion is attached to the rotating body and that extends in a radial direction.

11. The wave-power generator according to claim 10, wherein a pitch angle of the blade can be changed.

12. The wave-power generator according to claim 1,
    wherein the additional-mass body is formed of a rotational plate-like body fixed to the rotating body; and
    the rotational plate-like body is provided with a fin.

13. The wave-power generator according to claim 12, wherein the fin can be moved forward and backward with respect to the rotational plate-like body.

14. A wave-power generator comprising:
    a floating body that floats on a water surface;
    an oscillating body that is installed in the floating body via a spring and that linearly reciprocates in response to a fluctuation of the water surface; and
    a generator that generates power by being driven on the basis of the linear reciprocating motion of the oscillating body,
    wherein
    the floating body is provided with a projecting member projecting outward from a side thereof, and
    a floating-body cross-sectional area at the water surface can be adjusted by changing an orientation of the projecting member, so that a floating-body spring coefficient of the floating body is adjustable.

15. The wave-power generator according to claim 14, wherein a plurality of projecting members projecting outward from a side thereof are provided in the vertical direction.

16. The wave-power generator according to claim 14, further comprising an additional-mass body for adding a mass to a mass of the oscillating body,
    wherein the additional mass of the additional-mass body is adjustable.

17. The wave-power generator according to claim 14,
    wherein a water accommodating portion for accommodating water is provided in the floating body; and
    a holding water level in the water accommodating portion is adjustable.

18. The wave-power generator according to claim 17, wherein a hydraulic pump is used as a pump that pumps water into the water accommodating portion from outside of the floating body and/or that discharges the water in the water accommodating portion to the outside of the floating body.

* * * * *